United States Patent
Shih et al.

(10) Patent No.: US 12,014,564 B2
(45) Date of Patent: Jun. 18, 2024

(54) ELECTRONIC CIRCUIT AND A GATE DRIVER CIRCUIT

(71) Applicant: Novatek Microelectronics Corp., Hsinchu (TW)

(72) Inventors: Wei-Lun Shih, Hsinchu (TW); Wu Wei Lin, Taoyuan (TW); Kuei Jung Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 27 days.

(21) Appl. No.: 17/407,133

(22) Filed: Aug. 19, 2021

(65) Prior Publication Data

US 2022/0092287 A1    Mar. 24, 2022

Related U.S. Application Data

(60) Provisional application No. 63/080,799, filed on Sep. 21, 2020.

(51) Int. Cl.
*G06V 40/13* (2022.01)
*G06F 3/041* (2006.01)
*G09G 3/36* (2006.01)

(52) U.S. Cl.
CPC ............ *G06V 40/13* (2022.01); *G06F 3/0412* (2013.01); *G09G 3/36* (2013.01); *G09G 2300/0408* (2013.01); *G09G 2310/0286* (2013.01)

(58) Field of Classification Search
CPC ...... G06F 21/32; G06F 1/1652; G06F 3/4184; G06F 1/32–3296; G06F 3/04–04897;

(Continued)

(56) References Cited

U.S. PATENT DOCUMENTS 10,049,606 B2    8/2018    Lin et al.
11,093,080 B2    8/2021    Chen et al.
(Continued)

FOREIGN PATENT DOCUMENTS

CN    111176486    5/2020
CN    111596782    8/2020
(Continued)

OTHER PUBLICATIONS

"Office Action of Taiwan Counterpart Application", issued on Aug. 3, 2022, p. 1-p. 11.

*Primary Examiner* — Amr A Awad
*Assistant Examiner* — Aaron Midkiff
(74) *Attorney, Agent, or Firm* — JCIPRNET

(57) ABSTRACT

An electronic circuit adapted to control an operation of a gate driver circuit is provided. The electronic circuit includes a gate control circuit. The gate control circuit outputs control signals to the gate driver circuit in a display period and a fingerprint sensing period via the same output nodes. The control signals include a start pulse signal and a switch control signal. The switch control signal controls the gate driver circuit to operate in the display period or the fingerprint sensing period. The gate driver circuit includes a plurality of shift register groups and a switch circuit. The shift register groups output scan signals according to the start pulse signal. The switch circuit receives and outputs the scan signals to display scan lines in the display period and outputs the scan signals to fingerprint scan lines in the fingerprint sensing period according to the switch control signal.

13 Claims, 17 Drawing Sheets

(58) Field of Classification Search
CPC ......... G06F 2203/04102; G06F 1/1618; G06F 1/041–04897; G09G 2310/04; G09G 2310/02–0297; G09G 2300/0413; G09G 3/3266; G09G 2380/02; G09G 2330/00–12; G09G 3/367–3677; G06V 40/10–197; G11C 19/28–287; H10K 77/111; H10K 2102/311; H04M 1/0268
See application file for complete search history.

(56) References Cited

U.S. PATENT DOCUMENTS

| | | | | |
|---|---|---|---|---|
| 2016/0334908 | A1* | 11/2016 | Zhuang | G06F 3/0412 |
| 2016/0334923 | A1* | 11/2016 | Chan | G09G 3/3677 |
| 2016/0365061 | A1* | 12/2016 | Hong | G09G 5/003 |
| 2017/0011705 | A1* | 1/2017 | Lin | G09G 3/20 |
| 2017/0178749 | A1* | 6/2017 | Ma | G11C 19/287 |
| 2019/0088184 | A1* | 3/2019 | Morein | G06F 3/04166 |
| 2019/0164467 | A1* | 5/2019 | Seo | G09G 3/3688 |
| 2020/0168284 | A1 | 5/2020 | Yu et al. | |
| 2020/0210065 | A1 | 7/2020 | Chen et al. | |
| 2020/0273401 | A1 | 8/2020 | Lee | |
| 2021/0065610 | A1* | 3/2021 | Xu | G06F 3/0446 |
| 2021/0072854 | A1 | 3/2021 | Kuo et al. | |
| 2021/0294492 | A1 | 9/2021 | Chen et al. | |
| 2021/0304660 | A1* | 9/2021 | Maruyama | G09G 3/3266 |

FOREIGN PATENT DOCUMENTS

| | | |
|---|---|---|
| TW | 201703013 | 1/2017 |
| TW | 202024978 | 7/2020 |
| TW | 202032413 | 9/2020 |

\* cited by examiner

US 12,014,564 B2

ELECTRONIC CIRCUIT AND A GATE DRIVER CIRCUIT

CROSS-REFERENCE TO RELATED APPLICATION

This application claims the priority benefit of U.S. Provisional application Ser. No. 63/080,799, filed on Sep. 21, 2020. The entirety of the above-mentioned patent application is hereby incorporated by reference herein and made a part of this specification.

BACKGROUND

Technical Field

The invention relates to an electronic circuit and a gate driver circuit, more specifically, to an electronic circuit adapted to control an operation of a gate driver circuit, and a gate driver circuit adapted to drive a display panel.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. When a touch event such as fingerprint identification happens, the touch event may be reported to an application processor of the electronic device via a specified interface. Next, the application processor further controls a display driving circuit to drive the display panel to display image for fingerprint sensing. On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information.

However, for an electronic circuit capable of driving a display panel to perform a display operation and a fingerprint sensing operation, a plurality of pins and complex routing may be required between the electronic circuit and the display panel for signal transmission. The plurality of pins and complex routing would increase a width of a frame area of the display panel.

SUMMARY

The invention is directed to an electronic circuit adapted to control an operation of a gate driver circuit and a gate driver circuit adapted to drive a display panel, wherein a width of a frame area of the display panel is small.

An embodiment of the invention provides an electronic circuit adapted to control an operation of a gate driver circuit. The gate driver circuit is disposed on a display panel. The electronic circuit includes a gate control circuit. The gate control circuit is configured to output a plurality of control signals to the gate driver circuit in a display period via a plurality of output nodes of the electronic circuit. The gate control circuit is configured to output the control signals to the gate driver circuit in a fingerprint sensing period via the same output nodes of the electronic circuit. The control signals include clock signals, at least one start pulse signal and at least one switch control signal. The switch control signal is configured to control the gate driver circuit to operate in the display period or in the fingerprint sensing period.

In an embodiment of the invention, the display panel is divided into a plurality of fingerprint sensing zones in a column direction of the display panel. When the gate control circuit outputs the control signals to the gate driver circuit in the fingerprint sensing period, the gate driver circuit drives at least one fingerprint sensing zone of the fingerprint sensing zones to perform a fingerprint sensing operation.

In an embodiment of the invention, a finger touches only one fingerprint sensing zone of the fingerprint sensing zones in the fingerprint sensing period. The gate control circuit outputs one start pulse signal to the gate driver circuit, and thus the gate driver circuit drives the only one fingerprint sensing zone to sense a fingerprint of the finger according to the one start pulse signal.

In an embodiment of the invention, a finger touches at least two adjacent fingerprint sensing zones of the fingerprint sensing zones in the fingerprint sensing period. The gate control circuit outputs at least two start pulse signals to the gate driver circuit, and thus the gate driver circuit drives the at least two adjacent fingerprint sensing zones to sense a fingerprint of the finger according to the at least two start pulse signals.

In an embodiment of the invention, the gate control circuit outputs one start pulse signal to the gate driver circuit in the display period, and thus the gate driver circuit drives the display panel to perform a display operation according to the one start pulse signal.

In an embodiment of the invention, the gate control circuit outputs a plurality of start pulse signals to the gate driver circuit in the display period, and thus the gate driver circuit drives different zones of the display panel to perform a display operation according to the respective start pulse signals.

An embodiment of the invention provides a gate driver circuit disposed on a display panel. The display panel includes a plurality of display scan lines and a plurality of fingerprint scan lines. The gate driver circuit includes a plurality of shift register groups and a first switch circuit. The plurality of shift register groups are configured to output a plurality of scan signals according to at least one start pulse signal. The first switch circuit is coupled to the shift register groups and configured to receive the scan signals. According to at least one switch control signal, the first switch circuit outputs the scan signals to the display scan lines in a display period and outputs the scan signals to the fingerprint scan lines in a fingerprint sensing period.

In an embodiment of the invention, the gate driver circuit further includes a second switch circuit. The second switch circuit is coupled to the shift register groups. The second switch circuit is configured to connect two adjacent shift register groups of the shift register groups. The two adjacent shift register groups of the shift register groups include a first shift register group and a second shift register group adjacent to the first shift register group. The second switch circuit is conducted according to a start pulse control signal in the display period to transmit the at least one start pulse signal from the first shift register group to the second shift register group.

In an embodiment of the invention, the display panel is divided into a plurality of fingerprint sensing zones in a column direction of the display panel. The second switch circuit is not conducted according to the start pulse control signal in the fingerprint sensing period. The shift register groups output the scan signals to the fingerprint scan lines to drive the respective fingerprint sensing zones to perform a fingerprint sensing operation according to the respective start pulse signals.

In an embodiment of the invention, a finger touches only one fingerprint sensing zone of the fingerprint sensing zones. The corresponding shift register group outputs the scan signals to the fingerprint scan lines to drive the touched fingerprint sensing zone to perform the fingerprint sensing operation according to the start pulse signal in the fingerprint sensing period.

In an embodiment of the invention, a finger touches at least two adjacent fingerprint sensing zones of the fingerprint sensing zones. The at least two corresponding shift register groups output the scan signals to the fingerprint scan lines to drive the touched at least two adjacent fingerprint sensing zones to perform the fingerprint sensing operation according to the respective start pulse signals in the fingerprint sensing period.

In an embodiment of the invention, each of the shift register groups includes a plurality of shift registers. When the second switch circuit is conducted in the display period, a scan signal outputted from a last shift register of the first shift register group is transmitted to a first shift register of the second shift register group to serve as the start pulse signal via the second switch circuit.

In an embodiment of the invention, each of the shift register groups further includes a plurality of dummy shift registers. The dummy shift registers are skipped when the start pulse signal is transmitted via the second switch circuit.

In an embodiment of the invention, the gate driver circuit further includes a decoder. The decoder is coupled to the shift register groups and configured to decode at least one encoded start pulse signal to generate the at least one start pulse signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
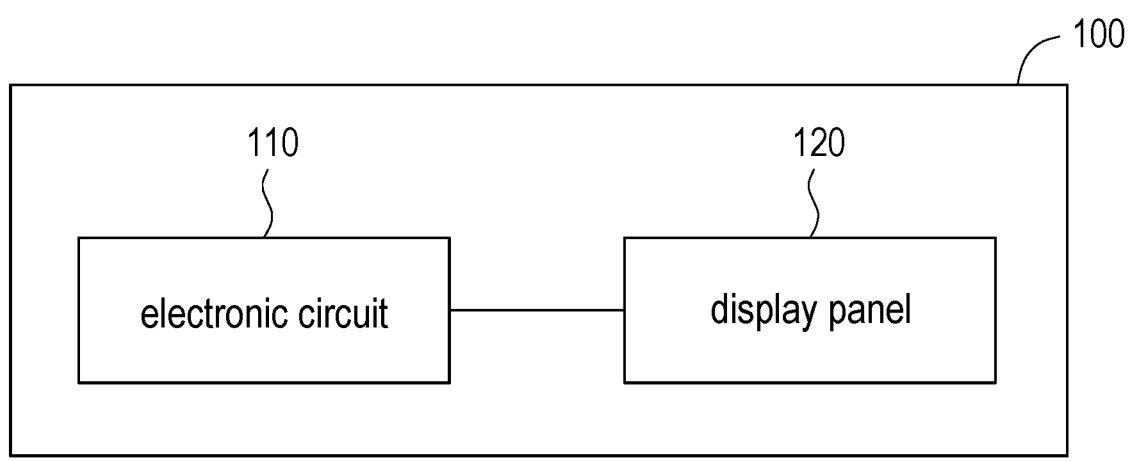
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes fingerprint sensors. The electronic circuit 110 is configurable to be coupled to the display panel 120. The electronic circuit 110 is adapted to drive the display panel 120.

In the present embodiment, the electronic device 100 may be an electronic device having a display function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
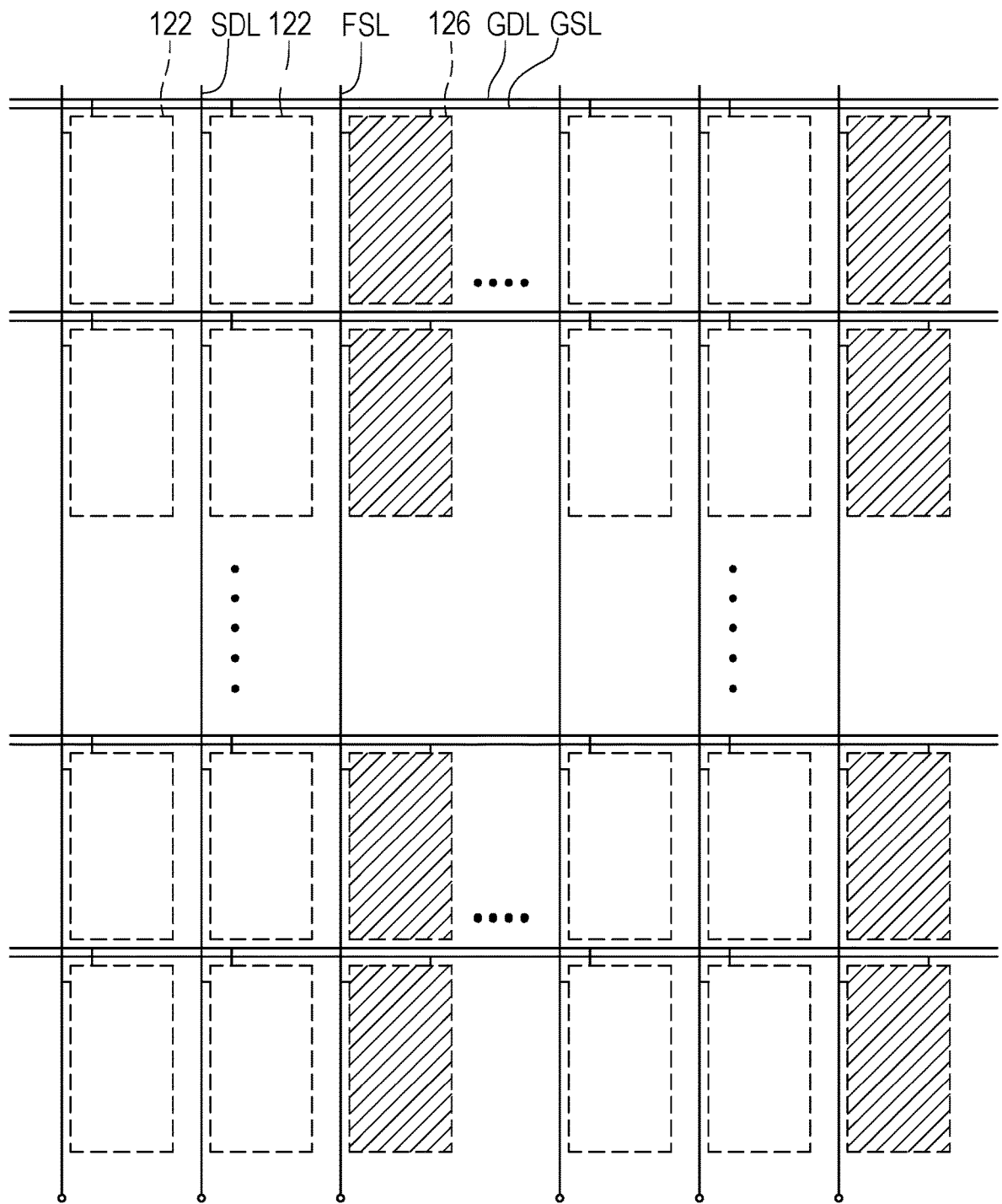
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122 and a plurality of fingerprint sensors 126. The electronic circuit 110 drives and controls the display panel 120 to perform a display operation and a fingerprint sensing operation. To be specific, the electronic circuit 110 drives and controls the display pixels 122 to display images via display scan lines GDL and display data lines SDL. The electronic circuit 110 also drives and controls the fingerprint sensors 126 to sense a fingerprint image on the display panel 120 via fingerprint scan lines GSL and fingerprint sensing lines FSL.

In an embodiment, the display panel 120 may be an in-cell fingerprint and display panel that the fingerprint sensors are embedded, but the invention is not limited thereto. In an embodiment, the electronic circuit 110 may drive and control the electronic device 100 to perform an in-display fingerprint identification operation, i.e. fingerprint recognition operation. In an embodiment, the fingerprint sensors 126 may be optical fingerprint sensors.

Figure 3:
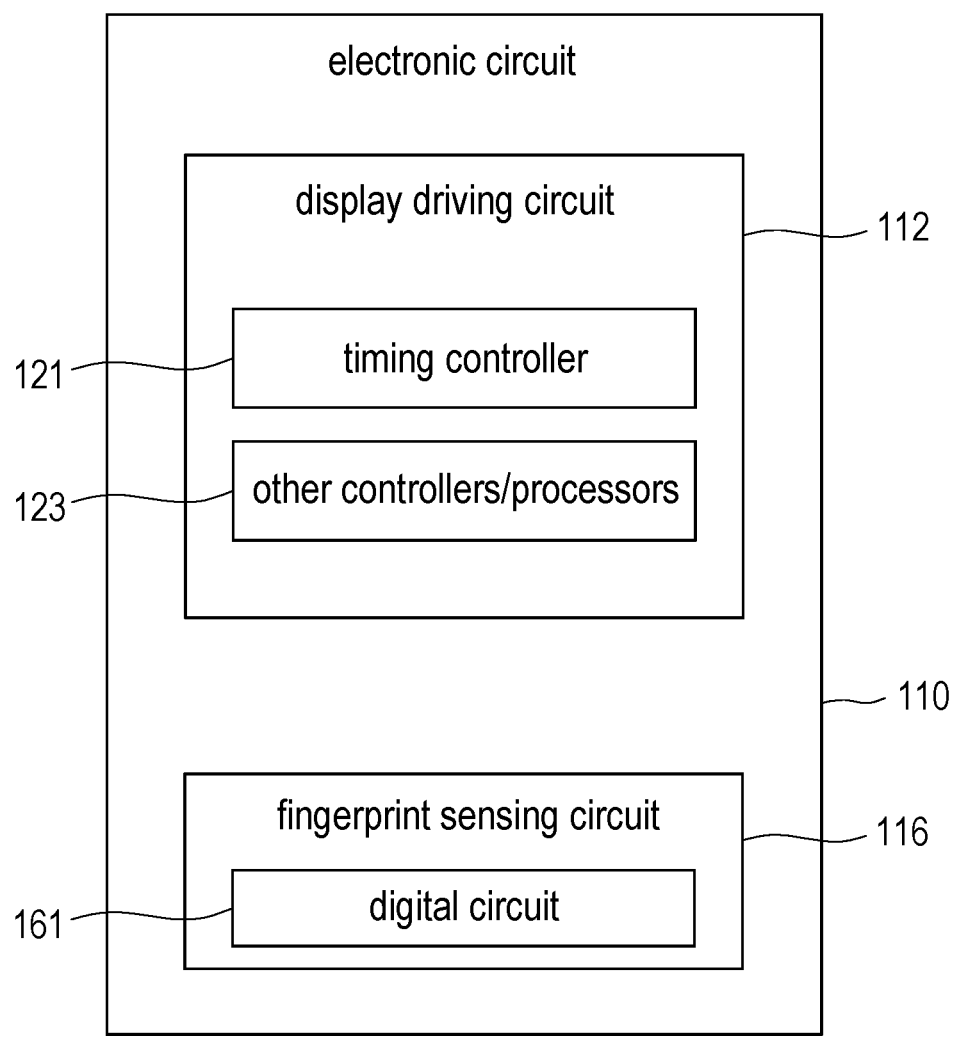
FIG. 3 is a schematic block diagram illustrating the electronic circuit depicted in FIG. 1.

FIG. 3 is a schematic block diagram illustrating the electronic circuit depicted in FIG. 1. Referring to FIG. 3, the electronic circuit 110 may include a display driving circuit 112 and a fingerprint sensing circuit 116. The display driving circuit 112 is configured to drive and control the display pixels 122 to display images via the display scan lines GDL and the display data lines SDL. The display driving circuit 112 generates display driving signals for driving the display data lines SDL of the display panel 120. The display driving circuit 112 may include a timing controller 121, a display driver and other functional circuits for the display operation. The display driving circuit 112 may also include other controllers or processors 123 for other control activities of the display operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 receives fingerprint sensing signals corresponding to a fingerprint image from the fingerprint sensors 126 and may also process the fingerprint sensing signals to obtain the fingerprint image. The fingerprint sensing circuit 116 may include a digital circuit 161, an AFE circuit, an ADC circuit and other functional circuits for the fingerprint sensing operation.

The electronic circuit 110 may be implemented as a single semiconductor chip or two separate semiconductor chips that respectively include the display driving circuit 112 and the fingerprint sensing circuit 116. When the electronic circuit 110 is implemented as the single semiconductor chip that can drive and control the display panel 120 to perform the display operation and the fingerprint sensing operation, the electronic circuit 110 may include a control circuit 130, and the control circuit 130 may be a micro-controller based core to perform all of control activities of the display operation and the fingerprint sensing operation. The control circuit 130 may include at least one of the timing controller 121, the digital circuit 161, and the other controllers or processors 123 of the display driving circuit 112.

The display driving circuit 112 and the fingerprint sensing circuit 116 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

Regarding hardware structures of the components in the embodiment of FIG. 3, the timing controller 121 and the digital circuit 161 may be a processor having computational capability. Alternatively, the timing controller 121 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the display driving circuit 112 and the fingerprint sensing circuit 116 can be obtained with reference to common knowledge in the related art, which is not repeated hereinafter.

In an embodiment, the display panel 120 may further include a plurality of touch sensors. The electronic device 100 may be an electronic device having a display function, a touch sensing function and a fingerprint sensing function. The electronic circuit 110 further drives and controls the display panel 120 to perform a touch sensing operation. To be specific, the electronic circuit 110 also drives and controls the touch sensors to sense a touch event of the display panel 120 via touch scan lines and touch sensing lines. The touch sensors may be touch sensing electrodes in a touch sensing period, and the touch sensors may be common electrodes in a display period. For in-cell touch sensors, the display panel 120 inherently has no touch scan lines. For other type touch sensors, the display panel 120 may have touch scan lines for transmitting touch driving signals. In an embodiment, the display panel 120 may be an in-cell fingerprint, touch and display panel that the fingerprint sensors and the touch sensors are embedded, but the invention is not limited thereto.

In an embodiment, the electronic circuit 110 may further include a touch sensing circuit. The touch sensing circuit is configured to drive and control the touch sensors to sense the touch event of the display panel 120 via the touch sensing lines. The touch sensing circuit may include a touch controller, an analog front end (AFE) circuit, an analog-to-digital converter (ADC) circuit and other functional circuits for the touch sensing operation.

In an embodiment, when the electronic circuit 110 is implemented as a single semiconductor chip that can drive and control the display panel 120 to perform the display operation, the touch sensing operation and the fingerprint sensing operation, the control circuit 130 may perform all of control activities of the display operation, the touch sensing operation and the fingerprint sensing operation. The control circuit 130 may include at least one of the timing controller 121, the touch controller, the digital circuit 161, and the other controllers or processors 123 of the display driving circuit 112.

Figure 4:
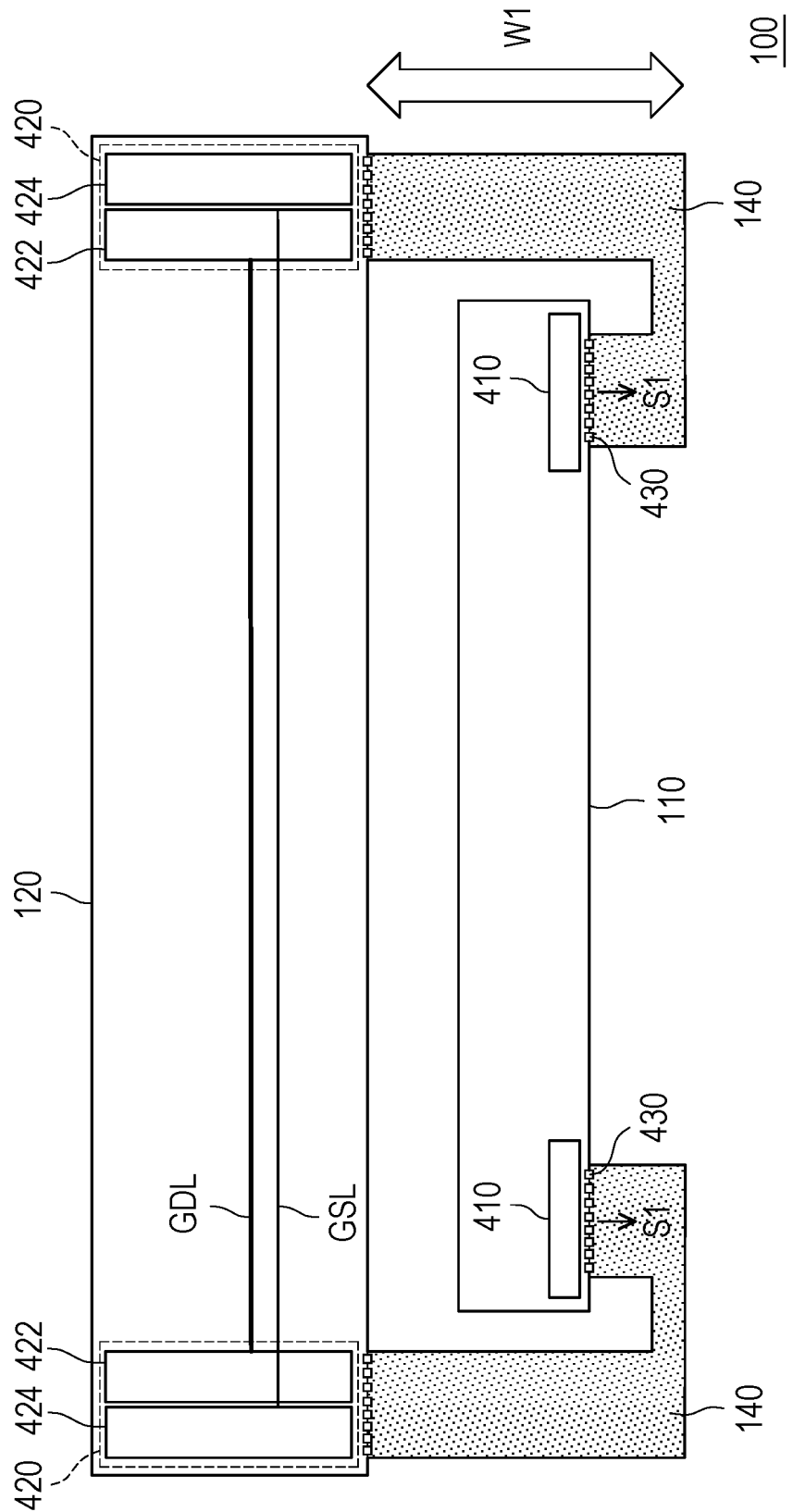
FIG. 4 is a schematic block diagram illustrating an electronic device according to another embodiment of the invention.

FIG. 4 is a schematic block diagram illustrating an electronic device according to another embodiment of the invention. Referring to FIG. 4, at least one gate driver circuit 420 is disposed on the display panel 120, and the electronic circuit 110 is adapted to control an operation of the at least one gate driver circuit 420. The electronic circuit 110 includes at least one gate control circuit 410. In the present embodiment, two gate driver circuits 420 and two gate control circuits 410 are illustrated as an example. The following description will focus on the gate control circuit 410 and the gate driver circuits 420 at one side of the electronic device 100, and the gate control circuit 410 and the gate driver circuits 420 at the other side may operate in the same manner.

The gate control circuit 410 is configured to output a plurality of control signals to the gate driver circuit 420 in a display period via a plurality of output nodes 430 of the electronic circuit 110. In addition, the gate control circuit 410 is also configured to output the control signals to the gate driver circuit 420 in a fingerprint sensing period via the same output nodes 430 of the electronic circuit 110. In an embodiment, the output nodes 430 may be pins of a semiconductor chip. Since the output nodes 430 are shared for signal transmission during different operation periods, a width W1 of the bottom frame area of the display panel 120 is small.

To be specific, the gate driver circuit 420 is disposed on the display panel 120 and includes a first gate on array (GOA) circuit 422 and a second gate on array (GOA) circuit 424. The first GOA circuit 422 is coupled to a plurality of display scan lines GDL. The display scan lines GDL are coupled to a plurality of display pixels (not shown). For clarity, only one display scan line GDL is shown in FIG. 4, but the invention is not limited thereto. The first GOA circuit 422, via the display scan lines GDL, outputs scan signals to drive the display pixels to display images in the display period. The second GOA circuit 424 is coupled to a plurality of fingerprint scan lines GSL. The fingerprint scan lines GSL are coupled to a plurality of fingerprint sensors (not shown). For clarity, only one fingerprint scan line GSL is shown in FIG. 4, but the invention is not limited thereto. The second GOA circuit 424, via the fingerprint scan lines GSL, outputs scan signals to drive the fingerprint sensors to sense fingerprint in the fingerprint sensing period.

The gate control circuit 410, via the output nodes 430, outputs at least one switch control signal S1 to the gate driver circuit 420. The switch control signal S1 is configured to control the gate driver circuit 420 to operate in the display period or in the fingerprint sensing period. The switch control signal S1 is outputted from the electronic circuit 110 in the display period and the fingerprint sensing period via a specified output node of the output nodes 430.

For example, the gate control circuit 410 may output the switch control signal S1 with a high signal level to control the gate driver circuit 420 to perform a display scanning operation in the display period, and thus the display panel 120 performs the display operation. On the other hand, the gate control circuit 410 may output the switch control signal S1 with a low signal level to control the gate driver circuit 420 to perform a sensing scanning operation in the fingerprint sensing period, and thus the display panel 120 performs the fingerprint sensing operation.

In the present embodiment, the electronic circuit 110 and the display panel 120 are connected via a signal transmission interface 140. The signal transmission interface 140 may include a flexible print circuit (FPC) having wire routing. Since the output nodes 430 are shared for signal transmission during different operation period, the wire routing of the signal transmission interface 140 is simple. Alternatively, in an embodiment that the electronic circuit 110 is attached on the display panel 120 by chip on glass (COG) or other similar techniques, the signal transmission interface 140 may include wire routing circuit on the display panel 120.

Figure 5:
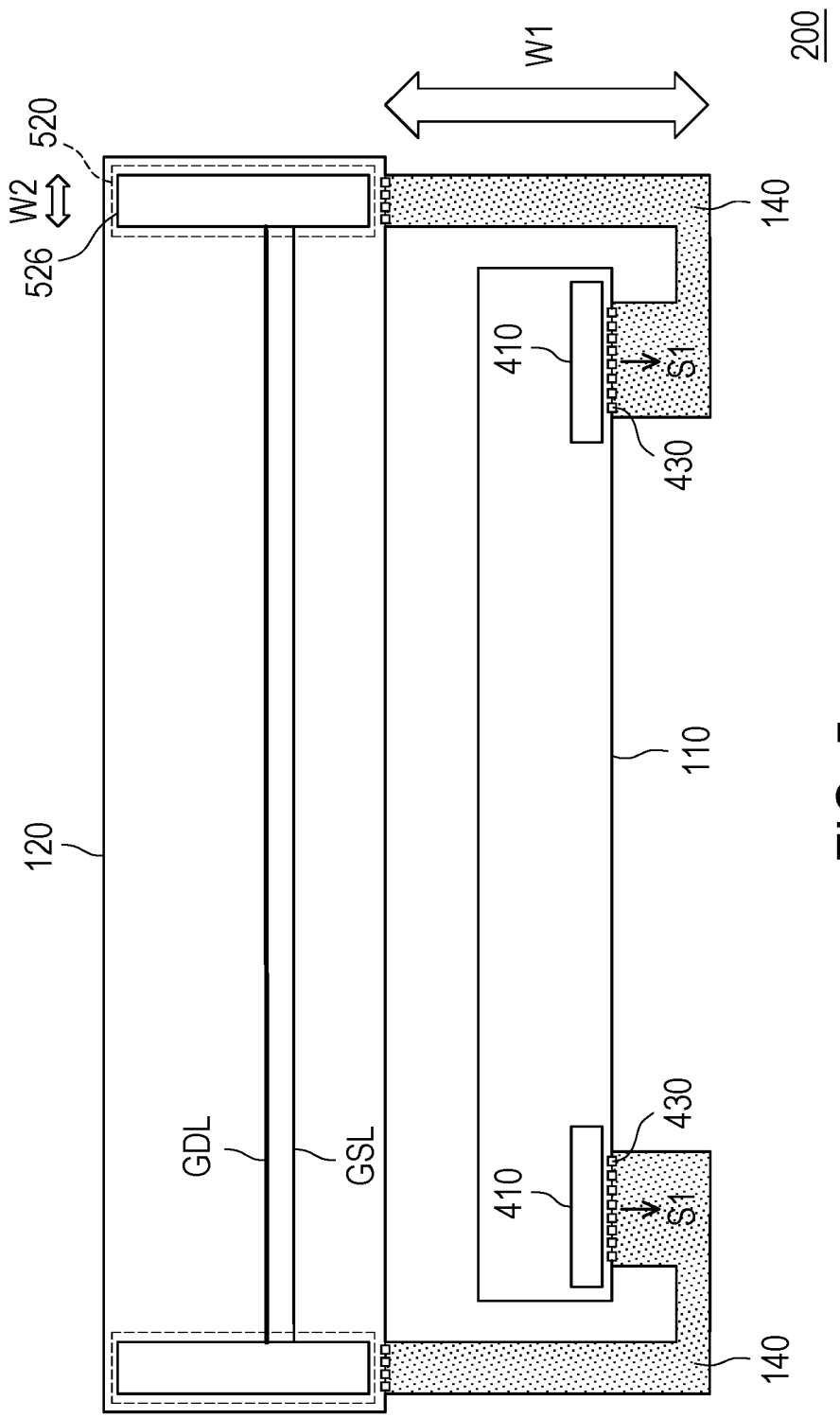
FIG. 5 is a schematic block diagram illustrating an electronic device according to another embodiment of the invention.

FIG. 5 is a schematic block diagram illustrating an electronic device according to another embodiment of the invention. Referring to FIG. 4 and FIG. 5, the electronic device 200 of the present embodiment is similar to the electronic device 100 of FIG. 4, and the main difference therebetween, for example, lies in that the gate driver circuit 520 include a single GOA circuit 526. The two separate GOA circuits 422 and 424 can be integrated into the single GOA circuit 526 to perform the scan operation in the display period and in the fingerprint sensing period.

The GOA circuit 526 is coupled to a plurality of display scan lines GDL and a plurality of fingerprint scan lines GSL. The GOA circuit 526, via the display scan lines GDL, outputs scan signals to drive the display pixels to display images in the display period, and via the fingerprint scan lines GSL, outputs scan signals to drive the fingerprint sensors to sense fingerprint in the fingerprint sensing period. The gate control circuit 410, via the output nodes 430, outputs at least one switch control signal S1 to the gate driver circuit 520, so as to control the gate driver circuit 520 to operate in the display period or in the fingerprint sensing period.

Taking the gate driver circuit 520 at the right side of the display panel 120 for example, since two separate GOA circuits 422 and 424 are integrated into the single GOA circuit 526, a width W2 of the right frame area of the display panel 120 is small. Similarly, since two separate GOA circuits 422 and 424 at the left side of the display panel 120 are integrated into a single GOA circuit 526, a width of the left frame area of the display panel 120 is small.

Figure 7:
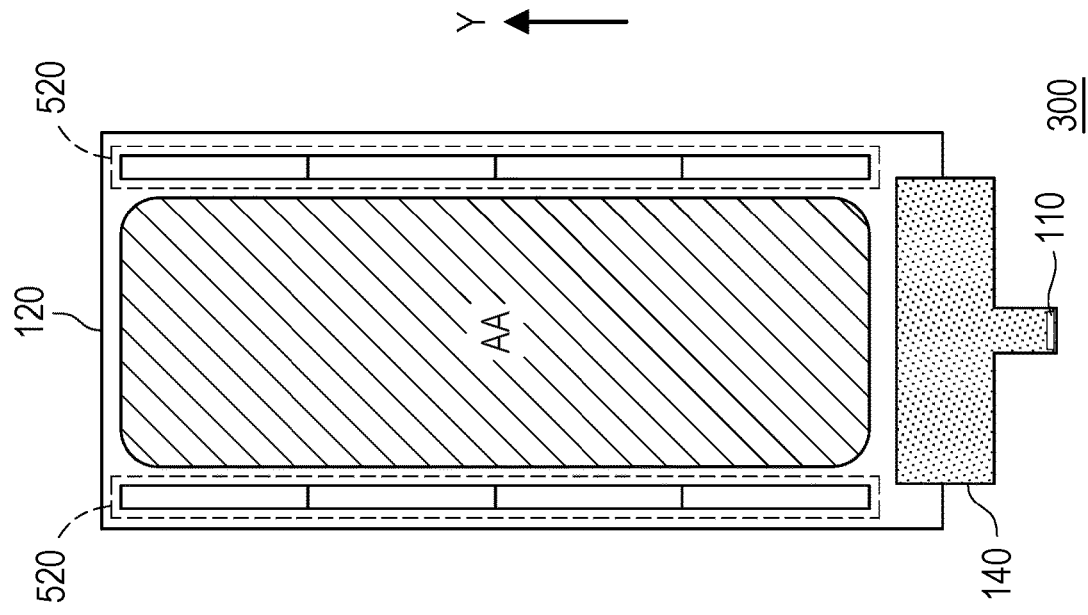
FIG. 7 is a schematic block diagram illustrating the electronic device of FIG. 6 operating in a display period.
Figure 6:
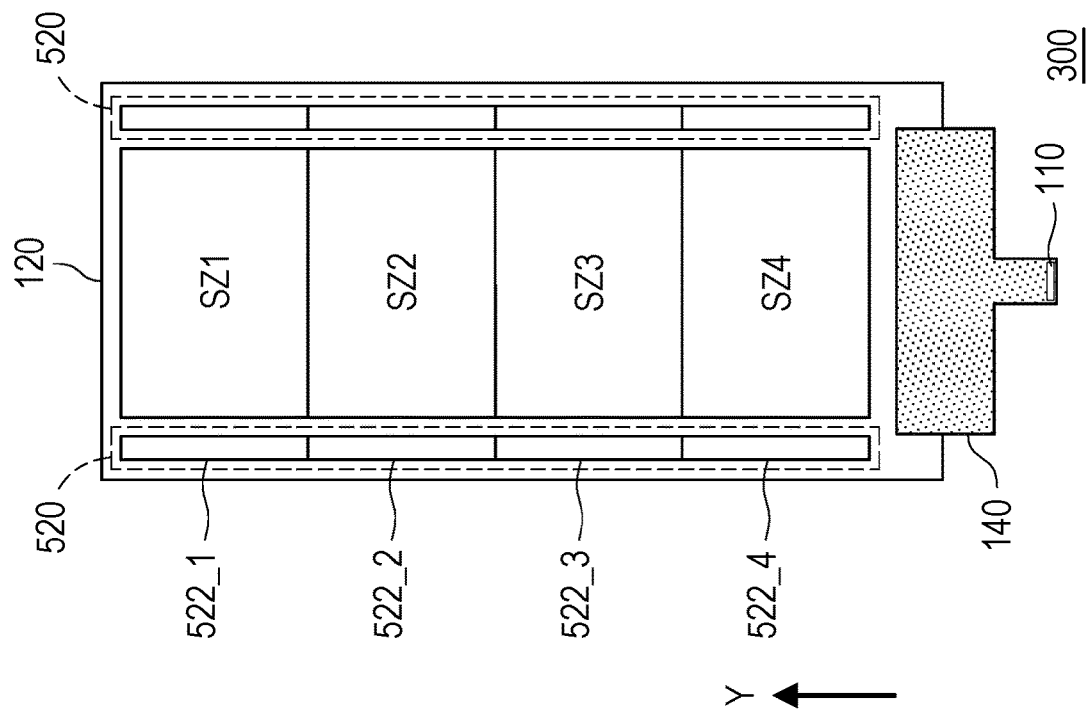
FIG. 6 is a schematic block diagram illustrating an electronic device operating in a fingerprint sensing period according to an embodiment of the invention.
Figure 8:
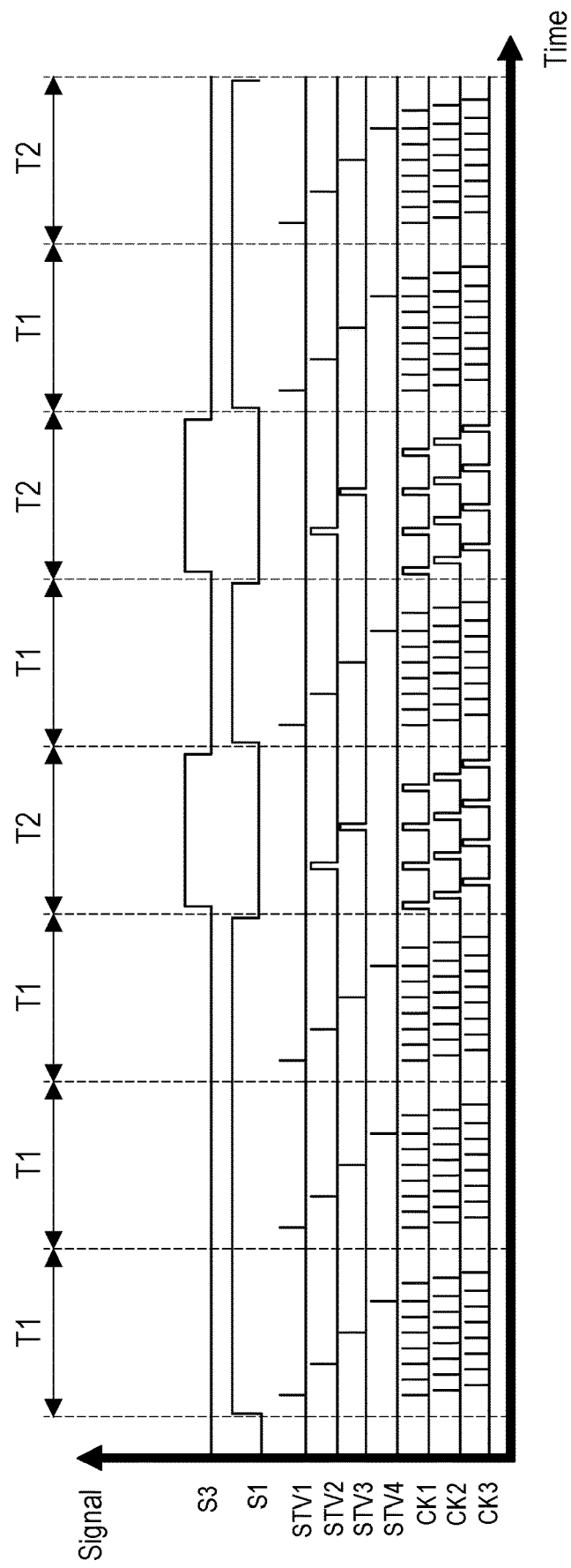
FIG. 8 is a waveform diagram of control signals for controlling an operation of the electronic device of FIG. 6.

FIG. 6 is a schematic block diagram illustrating an electronic device operating in a fingerprint sensing period according to an embodiment of the invention. FIG. 7 is a schematic block diagram illustrating the electronic device of FIG. 6 operating in a display period. FIG. 8 is a waveform diagram of control signals for controlling an operation of the electronic device of FIG. 6.

Referring to FIG. 6 to FIG. 8, the electronic device 300 may have a display function and a fingerprint sensing function. The electronic device 300 includes the electronic circuit 110 and the display panel 120, and the electronic circuit 110 and the display panel 120 are connected via the signal transmission interface 140. The electronic circuit 110 outputs a plurality of control signals to control the display panel 120 to perform the display operation of FIG. 7 or the fingerprint sensing operation of FIG. 6. As illustrated in FIG. 8, the control signals include clock signals CK1, CK2 and CK3, start pulse signals STV1, STV2, STV3 and STV4, the switch control signal S1 and a synchronization signal S3.

The gate driver circuits 520 are disposed on the display panel 120. Taking one of the gate driver circuits 520 for example, the electronic circuit 110 outputs the switch control signal S1 to the gate driver circuit 520, so as to control the gate driver circuit 520 to operate in the display period T1 or in the fingerprint sensing period T2. For example, the electronic circuit 110 outputs the switch control signal S1 with a high signal level to control the gate driver circuit 520 to perform a display scanning operation in the display period T1, and thus the display panel 120 performs the display operation of FIG. 7. On the other hand, the electronic circuit 110 outputs the switch control signal S1 with a low signal level to control the gate driver circuit 520 to perform a sensing scanning operation in the fingerprint sensing period T2, and thus the display panel 120 performs the fingerprint sensing operation of FIG. 6. Similar to FIG. 5, the electronic circuit 110 of the present embodiment may include at least one gate control circuit to perform the above-mentioned switch control operation.

Each of the gate driver circuits 520 includes a plurality of shift register groups 522_1, 522_2, 522_3 and 522_4. Taking one of the gate driver circuits 520 for example, the shift register groups 522_1, 522_2, 522_3 and 522_4 are configured to output a plurality of scan signals according to the control signals. For the fingerprint sensing operation, the display panel 120 is divided into a plurality of fingerprint sensing zones SZ1, SZ2, SZ3 and SZ4 in a column direction Y of the display panel 120. When the electronic circuit 110 outputs the control signals to the gate driver circuit 520 in the fingerprint sensing period T2, the gate driver circuit 520 drives at least one fingerprint sensing zone SZ1, SZ2, SZ3 and SZ4 to perform the fingerprint sensing operation.

For example, a finger touches at least two adjacent fingerprint sensing zones SZ2 and SZ3 in the fingerprint sensing period T2, and the electronic circuit 110 outputs at least two start pulse signals STV2 and STV3 to the gate driver circuit 520, i.e. the shift register groups 522_2 and 522_3, and thus the gate driver circuit 520 drives the fingerprint sensing zones SZ2 and SZ3 to sense a fingerprint of the finger according to the start pulse signals STV2 and STV3. That is to say, the shift register groups 522_2 and 522_3 output the scan signals to the fingerprint scan lines GSL to drive the respective fingerprint sensing zones SZ2 and SZ3 to perform the fingerprint sensing operation according to the respective start pulse signals STV2 and STV3. In addition, the electronic circuit 110 may further output the synchronization signal S3 with a high signal level to the gate driver circuit 520 to synchronize the fingerprint sensing operation of the two adjacent fingerprint sensing zones SZ2 and SZ3.

In an embodiment, a finger may touch only one fingerprint sensing zone, e.g. the fingerprint sensing zone SZ1, SZ2, SZ3 or SZ4, in the fingerprint sensing period T2, and the electronic circuit 110 may output a corresponding start pulse signal STV1, STV2, STV3 or STV4 to a corresponding shift register group of the gate driver circuit 520, i.e. one of the shift register groups 522_1, 522_2, 522_3 and 522_4, and thus the gate driver circuit 520 drives the only one fingerprint sensing zone SZ1, SZ2, SZ3 or SZ4 to sense a fingerprint of the finger according to the corresponding start pulse signal STV1, STV2, STV3 or STV4.

In the present embodiment, the number of the gate driver circuit 520, the number of the shift register groups 522_1, 522_2, 522_3 and 522_4, the number of the fingerprint sensing zones SZ1, SZ2, SZ3 and SZ4, and the number of the control signals are taken for example and do not intend to limit the invention.

For the display operation, a whole active area AA of the display panel 120 is driven to display images. When the electronic circuit 110 outputs the control signals to the gate driver circuit 520 in the display period T1, the gate driver circuit 520 drives the active area AA to perform the display operation. In the present embodiment, the electronic circuit 110 outputs the start pulse signals STV1, STV2, STV3 and STV4 to the gate driver circuit 520 in the display period T1, and thus the gate driver circuit 520 sequentially drives different zones of the display panel 120 to perform the display operation according to the respective start pulse signals.

Figure 9:
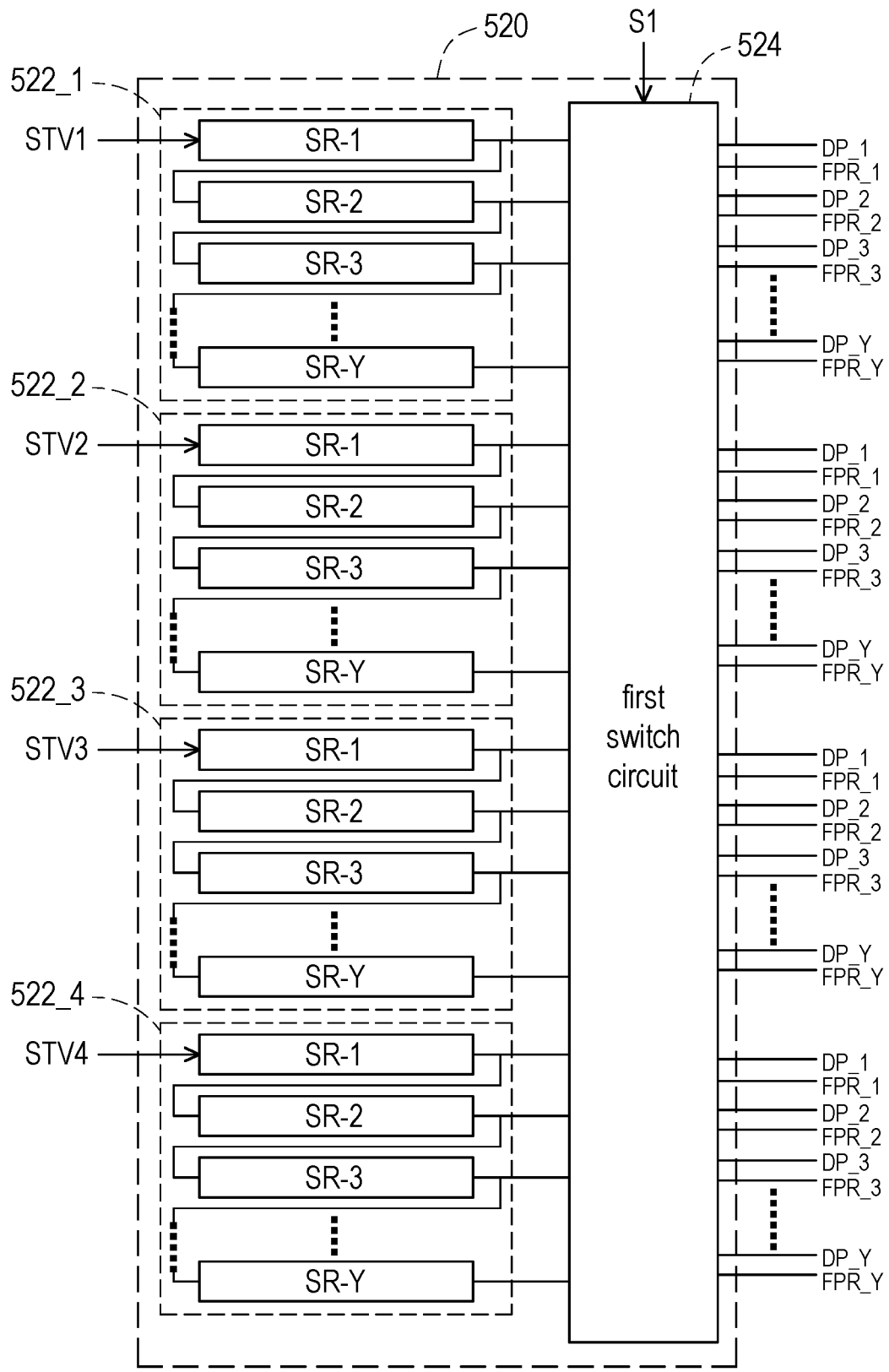
FIG. 9 is a schematic diagram illustrating the gate driver circuit according to an embodiment of the invention.

For example, FIG. 9 is a schematic diagram illustrating the gate driver circuit according to an embodiment of the invention. Referring to FIG. 9, the gate driver circuit 520 includes the plurality of shift register groups 522_1, 522_2, 522_3 and 522_4 and a first switch circuit 524. The shift register groups 522_1, 522_2, 522_3 and 522_4 output scan signals DP_1, DP_2 and DP3 to DP_Y in the display period T1 and scan signals FPR_1, FPR_2 and FPR_3 to FPR_Y in the fingerprint sensing period T2 according to at least one start pulse signal STV1, STV2, STV3 or STV4.

The first switch circuit 524 is coupled to the shift register groups 522_1, 522_2, 522_3 and 522_4. The first switch circuit 524 is configured to receive the scan signals DP_1, DP_2 and DP3 to DP_Y and FPR_1, FPR_2 and FPR_3 to FPR_Y. According to the switch control signal S1, the first switch circuit 524 outputs the scan signals DP_1, DP_2 and DP3 to DP_Y to the display scan lines GDL in the display period T1 and outputs the scan signals FPR_1, FPR_2 and FPR_3 to FPR_Y to the fingerprint scan lines GSL in the fingerprint sensing period T2.

To be specific, the shift register group 522_1 outputs scan signals DP_1, DP_2 and DP3 to DP_Y in the display period T1 to drive a corresponding zone of the active area AA according to the start pulse signal STV1. The shift register group 522_2 outputs scan signals DP_1, DP_2 and DP3 to DP_Y in the display period T1 to drive a corresponding zone of the active area AA according to the start pulse signal STV2. Similarly, the shift register groups 522_3 and 522_4 output scan signals DP_1, DP_2 and DP3 to DP_Y in the display period T1 to drive respective zones of the active area AA according to the respective start pulse signals STV3 and STV4.

On the other hand, when a finger touches the fingerprint sensing zones SZ2 and SZ3, the shift register groups 522_2 and 522_3 output the scan signals FPR_1, FPR_2 and FPR_3 to FPR_Y to the fingerprint scan lines GSL to drive the touched fingerprint sensing zones SZ2 and SZ3 to perform the fingerprint sensing operation according to the respective start pulse signals STV2 and STV3 in the fingerprint sensing period T2.

In an embodiment, when a finger touches only one fingerprint sensing zone, the corresponding shift register group outputs the scan signals FPR_1, FPR_2 and FPR_3 to FPR_Y to the fingerprint scan lines GSL to drive the touched fingerprint sensing zone to perform the fingerprint sensing operation according to the start pulse signal in the fingerprint sensing period T2.

Figure 10:
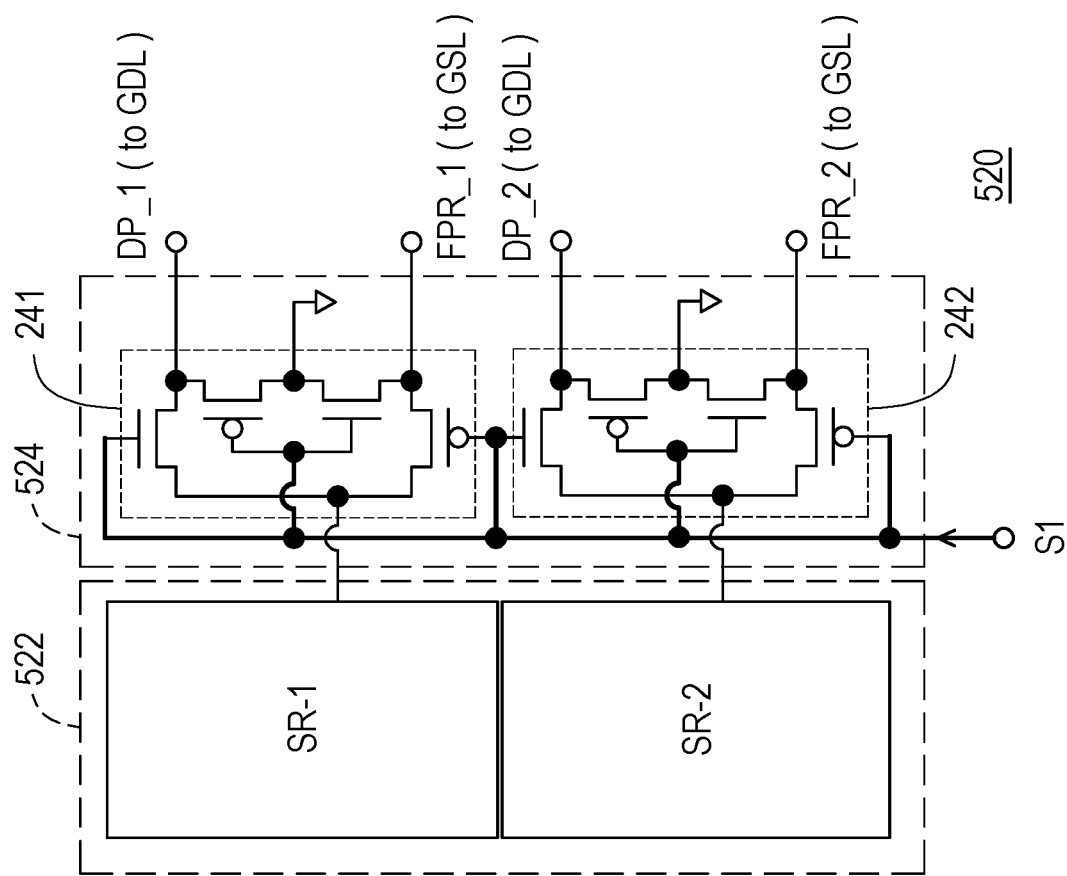
FIG. 10 is a schematic diagram illustrating the gate driver circuit according to another embodiment of the invention.

FIG. 10 is a schematic diagram illustrating the gate driver circuit according to another embodiment of the invention. The circuit structure of the first switch circuit 524 is further disclosed in FIG. 10. Referring to FIG. 10, the first switch circuit 524 receives the scan signals DP_1 and DP_2 from the shift register group 522 in the display period T1, and receives the scan signals FPR_1 and FRP_2 from the shift register group 522 in the fingerprint sensing period T2. According to the switch control signal S1, the first switch circuit 524 outputs the scan signals DP_1 and DP_2 to the display scan lines GDL in the display period T1, and outputs the scan signals FPR_1 and FRP_2 to the fingerprint scan lines GSL in the fingerprint sensing period T2.

To be specific, the shift register group 522 includes a plurality of shift registers SR-1 and SR-2, and the first switch circuit 524 includes a plurality of switch units 241 and 242 controlled by the switch control signal S1. In the display period T1, the switch units 241 and 242 receive the scan signals DP_1 and DP_2 from the shift registers SR-1 and SR-2, respectively. In the fingerprint sensing period T2, the switch units 241 and 242 receive the scan signals FPR_1 and FPR_2 from the shift registers SR-1 and SR-2, respectively.

Each of the switch units 241 and 242 can be implemented by complementary metal-oxide-semiconductor (CMOS) transistors. When the switch control signal S1 with a high signal level is inputted to the switch units 241 and 242 in the display period T1, the switch units 241 and 242 are switched to output scan signals DP_1 and DP_2 to the display scan lines GDL. When the switch control signal S1 with a low signal level is inputted to the switch units 241 and 242 in the fingerprint sensing period T2, the switch units 241 and 242 are switched to output scan signals FPR_1 and FPR_2 to the fingerprint scan lines GSL. Therefore, the gate driver circuit 520 can operate in a time-division manner, so as to output different scan signals in different operation period.

In the present embodiment, the number of the shift register group 522, the number of the shift registers SR-1 and SR-2, the number of the scan signals DP_1, DP_2, FPR_1 and FPR_2, and the number of the switch units 241 and 242 are taken for example and do not intend to limit the invention.

In the present embodiment, the first switch circuit 524 is controlled by the switch control signal S1, and thus the switch control signal S1 can provide a different power domain for the switch units 241 and 242. Operating voltages of the switch units 241 and 242 may be the same as or different from operating voltages of the shift registers SR-1 and SR-2.

Figure 11:
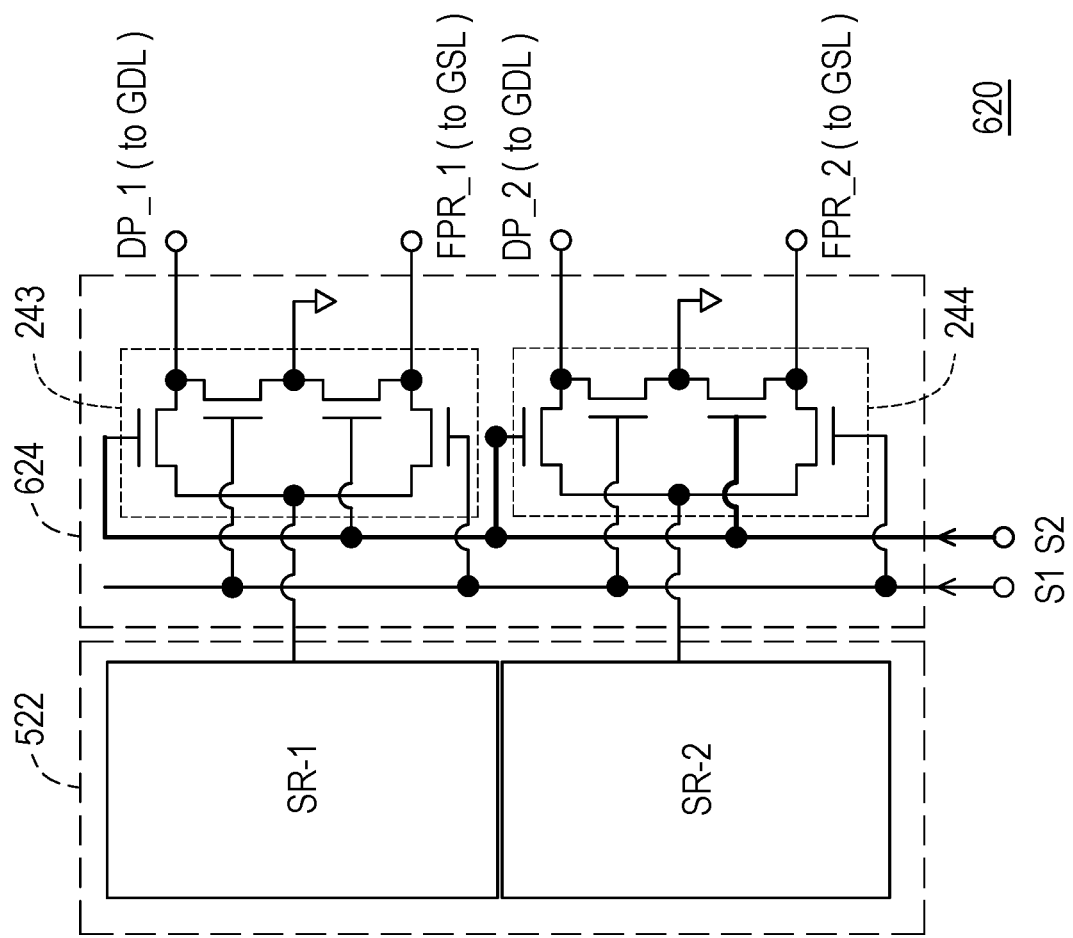
FIG. 11 is a schematic diagram illustrating the gate driver circuit according to another embodiment of the invention.
Figure 12:
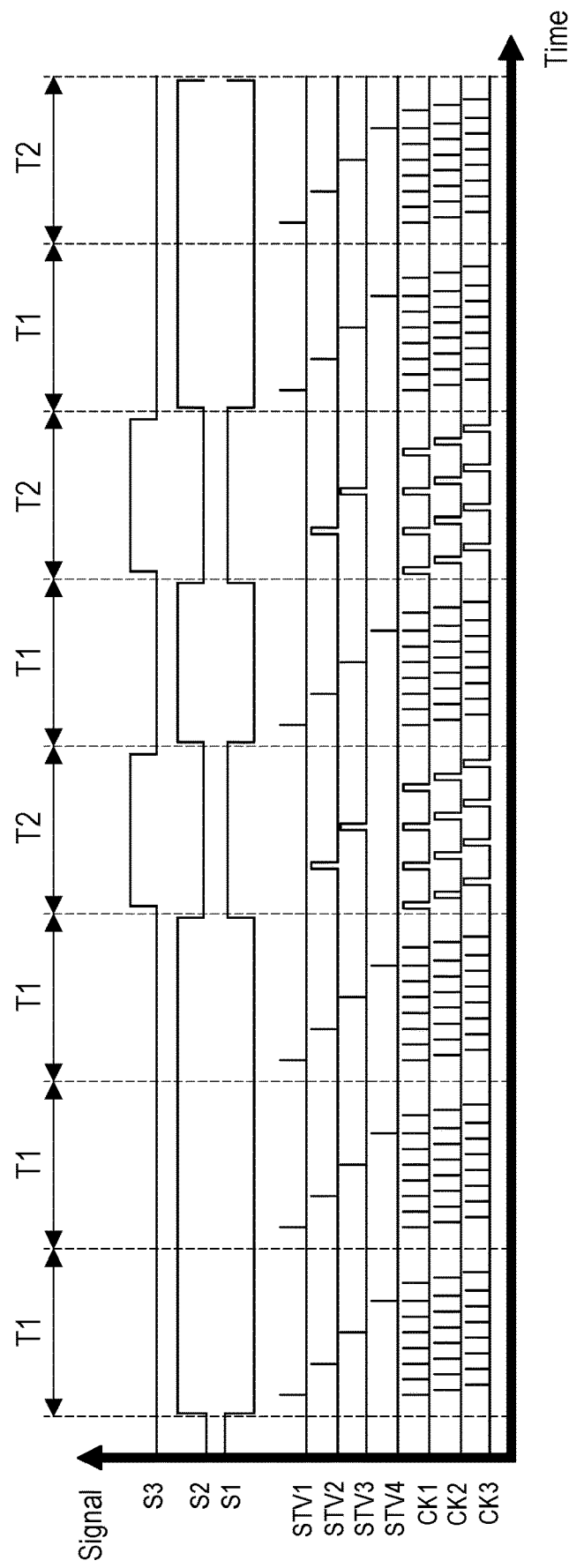
FIG. 12 is a waveform diagram of control signals for controlling an operation of the gate driver circuit of FIG. 11.

FIG. 11 is a schematic diagram illustrating the gate driver circuit according to another embodiment of the invention. FIG. 12 is a waveform diagram of control signals for controlling an operation of the gate driver circuit of FIG. 11. The circuit structure of the first switch circuit 624 is further disclosed in FIG. 11. Referring to FIG. 11 to FIG. 12, the first switch circuit 624 receives the scan signals DP_1 and DP_2 from the shift register group 522 in the display period T1, and receives the scan signals FPR_1 and FRP_2 from the shift register group 522 in the fingerprint sensing period T2. According to the switch control signals S1 and S2, the first switch circuit 624 outputs the scan signals DP_1 and DP_2 to the display scan lines GDL in the display period T1 and outputs the scan signals FPR_1 and FPR_2 to the fingerprint scan lines GSL in the fingerprint sensing period T2.

To be specific, the shift register group 522 includes a plurality of shift registers SR-1 and SR-2, and the first switch circuit 624 includes a plurality of switch units 243 and 244 controlled by the switch control signals S1 and S2. In the display period T1, the switch units 243 and 244 receive the scan signals DP_1 and DP_2 from the shift registers SR-1 and SR-2, respectively. In the fingerprint sensing period T2, the switch units 243 and 244 receive the scan signals FPR_1 and FPR_2 from the shift registers SR-1 and SR-2, respectively.

Each of the switch units 243 and 244 can be implemented by n-type metal-oxide-semiconductor (NMOS) transistors. When the switch control signal S1 with a low signal level and the switch control signal S2 with a high signal level are inputted to the switch units 243 and 244 in the display period T1, the switch units 243 and 244 are switched to output scan signals DP_1 and DP_2 to the display scan lines GDL. When the switch control signal S1 with a high signal level and the switch control signal S2 with a low signal level are inputted to the switch units 243 and 244 in the fingerprint sensing period T2, the switch units 243 and 244 are switched to output scan signals FPR_1 and FPR_2 to the fingerprint scan lines GSL. Therefore, the gate driver circuit 520 can operate in a time-division manner, so as to output different scan signals in different operation period.

In the present embodiment, the number of the shift register group 522, the number of the shift registers SR-1 and SR-2, the number of the scan signals DP_1, DP_2, FPR_1 and FPR_2, the number of the switch control signals S1 and S2, and the number of the switch units 243 and 244 are taken for example and do not intend to limit the invention.

In the present embodiment, the first switch circuit 624 is controlled by the switch control signals S1 and S2, and thus the switch control signals S1 and S2 can provide a different power domain for the switch units 241 and 242. Operating voltages of the switch units 243 and 244 may be the same as or different from operating voltages of the shift registers SR-1 and SR-2.

Figure 13:
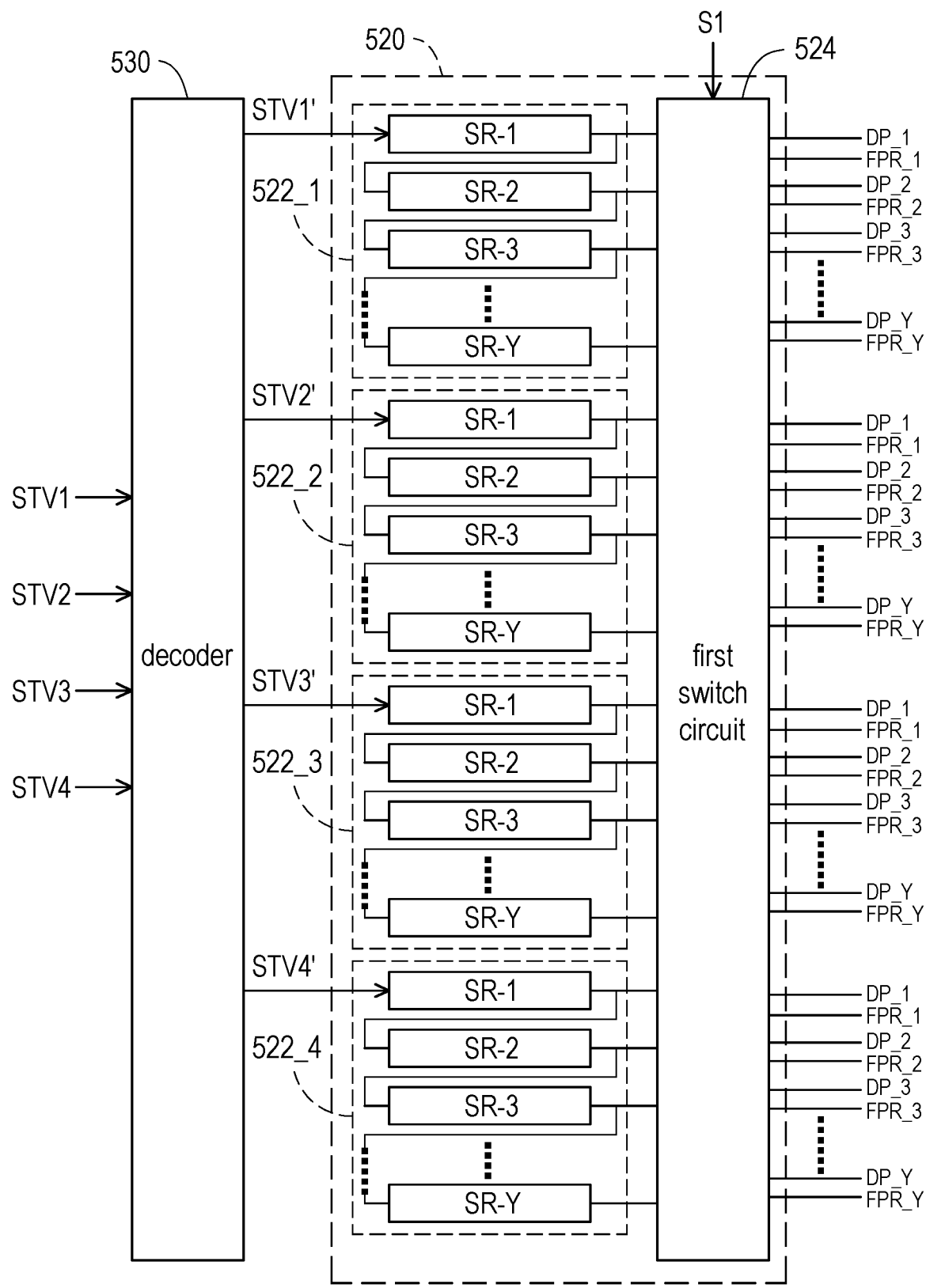
FIG. 13 is a schematic diagram illustrating the gate driver circuit and a decoder according to an embodiment of the invention.
Figure 14:
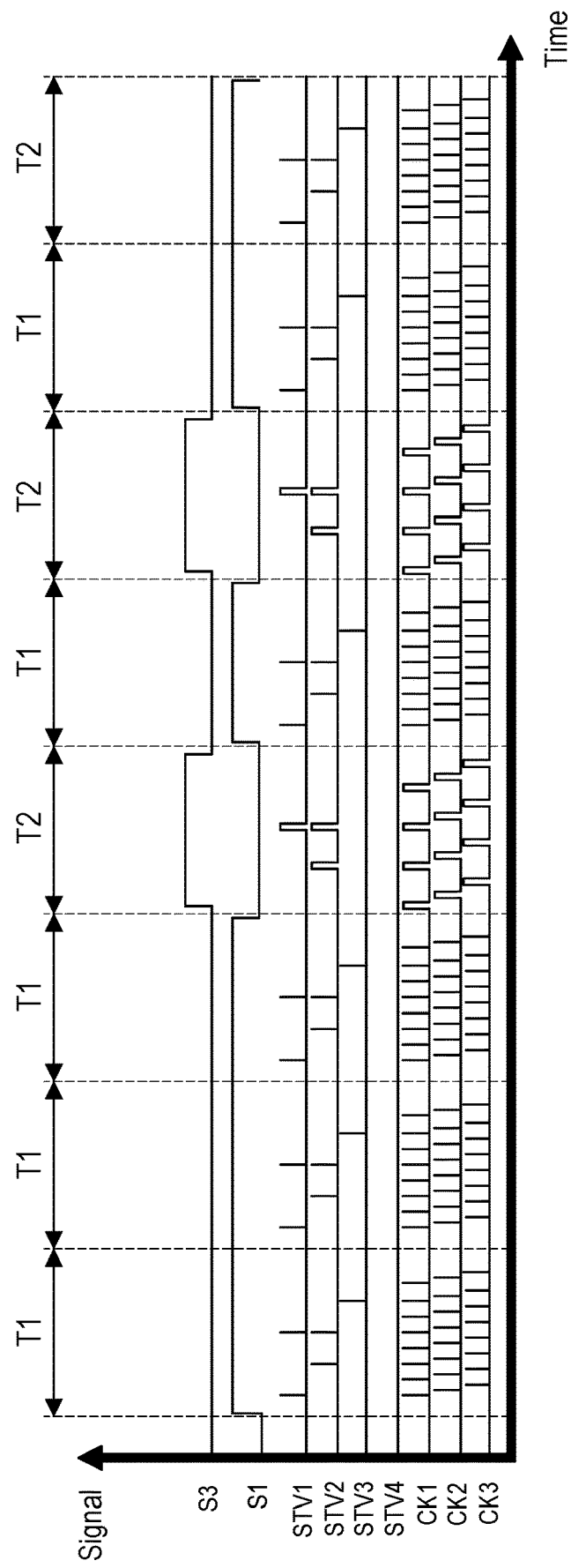
FIG. 14 is a waveform diagram of control signals for controlling an operation of the gate driver circuit and the decoder of FIG. 13.

FIG. 13 is a schematic diagram illustrating the gate driver circuit and a decoder according to an embodiment of the invention. FIG. 14 is a waveform diagram of control signals for controlling an operation of the gate driver circuit and the decoder of FIG. 13. Referring to FIG. 13 and FIG. 14, the decoder 530 is disposed on the display panel 120. The decoder 530 can be disposed inside the gate driver circuit 520 or disposed outside of the gate driver circuit 520. The decoder 530 is coupled to the shift register groups 522_1 to 522_4. The start pulse signals STV1, STV2, STV3 and STV4 may be encoded with a predetermined encoding method, e.g. a binary encoding scheme, by the electronic circuit 110, but the invention is not limited thereto. The decoder 530 is configured to receive the encoded start pulse signals STV1, STV2, STV3 and STV4 from the gate control circuit 410 of the electronic circuit 110 and decode the encoded start pulse signals STV1, STV2, STV3 and STV4.

The gate control circuit 410 may obtain the information about the selected fingerprint sensing zones of the display panel 120. In the embodiment illustrated in FIG. 6, the selected fingerprint sensing zones may include the fingerprint sensing zones SZ2 and SZ3 encompassing the touched region. Namely, the gate control circuit 410 may select corresponding fingerprint sensing zones (e.g., the fingerprint sensing zones SZ2 and SZ3) from the fingerprint sensing zones SZ1 to SZ4 according to the touched region.

The gate control circuit 410 may provide the encoded start pulse signals STV1, STV2, STV3 and STV4 to the decoder 530 for controlling the display panel 120 to perform the fingerprint sensing. Namely, the gate control circuit 410 may generate the corresponding start pulse signals STV1, STV2, STV3 and STV4 according to the information about the selected fingerprint sensing zones SZ2 and SZ3. Each of the start pulse signals STV1, STV2, STV3 and STV4 has a respective logic state, and a logical state set of the start pulse signals STV1, STV2, STV3 and STV4 and the fingerprint sensing zones have a mapping relationship as shown in Table 1. Table 1 shows the mapping relationship between the start pulse signals STV1, STV2, STV3 and STV4 and the fingerprint sensing zones.

TABLE 1

| Start pulse signal | STV4 | STV3 | STV2 | STV1 | NF |
| --- | --- | --- | --- | --- | --- |
| No fingerprint zone | 0 | 0 | 0 | 0 | 0 |
| SZ1 | 0 | 0 | 0 | 1 | 1 |
| SZ2 | 0 | 0 | 1 | 0 | 2 |
| SZ3 | 0 | 0 | 1 | 1 | 3 |
| SZ4 | 0 | 1 | 0 | 0 | 4 |
| SZ5 | 0 | 1 | 0 | 1 | 5 |
| SZ6 | 0 | 1 | 1 | 0 | 6 |
| SZ7 | 0 | 1 | 1 | 1 | 7 |
| SZ8 | 1 | 0 | 0 | 0 | 8 |
| SZ9 | 1 | 0 | 0 | 1 | 9 |
| SZ10 | 1 | 0 | 1 | 0 | 10 |
| SZ11 | 1 | 0 | 1 | 1 | 11 |
| SZ12 | 1 | 1 | 0 | 0 | 12 |
| SZ13 | 1 | 1 | 0 | 1 | 13 |
| SZ14 | 1 | 1 | 1 | 0 | 14 |
| SZ15 | 1 | 1 | 1 | 1 | 15 |

For example (but not limited to), the respective logic state of each of the start pulse signals STV1, STV2, STV3 and STV4 may have a plurality of logic values. The selected fingerprint sensing zones are indicated according to a mathematical formula of the logic values of the logic states of the start pulse signals STV1, STV2, STV3 and STV4.

The logic values and the mathematical formula may be determined based on a design requirement. For example, in some embodiments, the logic values includes 0 and 1, and the mathematical formula is $NF=\Sigma_{i=0}^{N_2-1} STV\_(i+1)\cdot 2^i$. NF is an index number of the selected fingerprint sensing zone (that is when the fingerprint zone SZ_i is selected, NF=i), STV_(i+1) also denotes a logic value of an $(i+1)^{th}$ start pulse signal STV_(i+1), i is an integer from 0 to $N_2-1$, and $N_2$ indicates the number of the encoded start pulse signals STV1, STV2, STV3 and STV4. In the embodiment of FIG. 6, since the display panel 120 is divided into four fingerprint sensing zones SZ1, SZ2, SZ3 and SZ4 in the column direction Y, the maximum number of NF is 4.

In this embodiment, NF is expressed as a power of two. In other embodiments, NF can be any other number power, or there can be any functional relationship (or mapping relationship) between NF and the logical values of the start pulse signals. As long as the total number of start pulse signals (and related signal lines) provided by the IC to the panel can be reduced, it can be used according to design or application requirements.

For example, it is assumed that the number of the total fingerprint sensing zone is 15, and the number of the encoded start pulse signals is 4. The logical state set of the start pulse signals STV1, STV2, STV3 and STV4 and the selected fingerprint sensing zone (denoted by the index number NO among the total fingerprint sensing zones have the mapping relationship defined by Table 1 based on the formula $NF=\Sigma_{i=0}^{N_2-1} STV\_(i+1)\cdot 2^i$. When the logic state set of the start pulse signals STV4, STV3, STV2 and STV1 is "0000", each of STV4, STV3, STV2 and STV1 is 0, and therefore NF=0, so it means that there is no fingerprint sensing zone that needs to be scanned. When the logic state set of the start pulse signals STV4, STV3, STV2 and STV1 is "0001", STV4, STV3, STV2 and STV1 are 0, 0, 0, and 1, respectively, and therefore NF=1, so it means that the first fingerprint zone SZ1 needs to be scanned. Other logical state sets of the start pulse signals STV1, STV2, STV3 and STV4 and the selected fingerprint sensing zones can be analogized and omitted here for brevity.

The mapping relationship between input and output of the decoder 530 may be a mapping relationship defined by Table 2 below. Table 2 shows the mapping relationship between the start pulse signals STV1, STV2, STV3 and STV4 and the start pulse signals STV1' to STV15'.

TABLE 2

| Input | | | | Output |
|---|---|---|---|---|
| STV4 | STV3 | STV2 | STV1 | STV1' to STV15' |
| 0 | 0 | 0 | 0 | STV1' to STV15' are all 0 |
| 0 | 0 | 0 | 1 | STV1' = 1, the rest are 0 |
| 0 | 0 | 1 | 0 | STV2' = 1, the rest are 0 |
| 0 | 0 | 1 | 1 | STV3' = 1, the rest are 0 |
| 0 | 1 | 0 | 0 | STV4' = 1, the rest are 0 |
| 0 | 1 | 0 | 1 | STV5' = 1, the rest are 0 |
| 0 | 1 | 1 | 0 | STV6' = 1, the rest are 0 |
| 0 | 1 | 1 | 1 | STV7' = 1, the rest are 0 |
| 1 | 0 | 0 | 0 | STV8' = 1, the rest are 0 |
| 1 | 0 | 0 | 1 | STV9' = 1, the rest are 0 |
| 1 | 0 | 1 | 0 | STV10' = 1, the rest are 0 |
| 1 | 0 | 1 | 1 | STV11' = 1, the rest are 0 |
| 1 | 1 | 0 | 0 | STV12' = 1, the rest are 0 |
| 1 | 1 | 0 | 1 | STV13' = 1, the rest are 0 |

TABLE 2-continued

| Input | | | | Output |
|---|---|---|---|---|
| STV4 | STV3 | STV2 | STV1 | STV1' to STV15' |
| 1 | 1 | 1 | 0 | STV14' = 1, the rest are 0 |
| 1 | 1 | 1 | 1 | STV15' = 1, the rest are 0 |

In the embodiment of FIG. 6, since the display panel 120 is divided into four fingerprint sensing zones SZ1, SZ2, SZ3 and SZ4 in the column direction Y, only four decoded start pulse signals STV1' to STV4' are required for driving the four fingerprint sensing zones SZ1, SZ2, SZ3 and SZ4.

When the logic state set of the start pulse signals STV4, STV3, STV2 and STV1 (input of the decoder 530) is "0000", the start pulse signals STV1', STV2', STV3' and STV4' (output of the decoder 530) are all 0. When the logic state set of the start pulse signals STV4, STV3, STV2 and STV1 is "0001", the start pulse signal STV1' is 1 and the rest of the start pulse signals STV2', STV3' and STV4' are 0. Other logical state sets of the start pulse signals STV1, STV2, STV3 and STV4 and the start pulse signals STV1', STV2', STV3' and STV4' can be analogized and omitted here for brevity.

More specifically, when the logic state set of the start pulse signals STV1', STV2', STV3' and STV4' is "1000", the first fingerprint sensing zone SZ1 needs to be scanned. When the logic state set of the start pulse signals STV1', STV2', STV3' and STV4' is "0100", the second fingerprint zone SZ2 needs to be scanned. Other logical state sets of the start pulse signals STV1', STV2', STV3' and STV4' and the selected fingerprint sensing zones can be analogized and omitted here for brevity.

Accordingly, only four wires are disposed between the electronic circuit 110 and the display panel 120, and thereby, the start pulse signals STV1, STV2, STV3 and STV4 may be transmitted to the display panel 120. Thus, the frame area of the display panel 120 illustrated in FIG. 6 may be reduced since the total number of the wires coupled between the electronic circuit 110 and the display panel 120 is reduced to 4.

Therefore, the decoder 530 decodes the start pulse signals STV1, STV2, STV3 and STV4 to obtain the information about which one of the fingerprint sensing zones SZ1, SZ2, SZ3 and SZ4 is to be scanned in the fingerprint sensing period T2. For example, the decoder 530 may obtain the information about the selected fingerprint sensing zones (e.g., the fingerprint sensing zones SZ2 and SZ3) according to the logic values of the start pulse signals STV1, STV2, STV3 and STV4. Thus, the start pulse signals STV1, STV2, STV3 and STV4 may collectively indicate the selected fingerprint sensing zones SZ2 and SZ3. For example, taking Table 1 as an example for explanation, when the start pulse signals STV4, STV3, STV2 and STV1 are "0010", the fingerprint sensing zone SZ2 is the selected fingerprint sensing zone, and thus, the decoder 530 applies a pulse to the start pulse signal STV2' and does not apply the pulse to the other start pulse signals STV1', STV3' and STV4'. When the start pulse signals STV4, STV3, STV2 and STV1 are "0011", the fingerprint sensing zone SZ3 is the selected fingerprint sensing zone, and thus, the decoder 530 applies a pulse to the start pulse signal STV3' and does not apply the pulse to the other start pulse signals STV1', STV2' and STV4'.

On the other hand, the decoder 530 decodes the encoded start pulse signals STV1, STV2, STV3 and STV4 to obtain the information about which one of display areas is to be scanned in the display period T1. For example, when the logic values of the start pulse signals STV4, STV3, STV2 and STV1 are "0001", it indicates that the display area corresponding to the shift register group 522_1 should be scanned, and thus the decoder 530 outputs a start pulse signal STV1' with a high signal level to the shift register group 522_1. The shift register group 522_1 outputs scan signals to drive the corresponding display area to display images according to the start pulse signal STV1' and clock signals CK1 to CK3. Similarly, when the logic values of the start pulse signals STV4, STV3, STV2 and STV1 are "0010", it indicates that the display area corresponding to the shift register group 522_2 should be scanned, and thus the decoder 530 outputs a start pulse signal STV2' with a high signal level to the shift register group 522_2. The shift register group 522_2 outputs scan signals to drive the corresponding display area to display images according to the start pulse signal STV2' and clock signals CK1 to CK3. The logic values "0011" and "0100" of the start pulse signals STV4, STV3, STV2 and STV1 respectively indicate that the display areas corresponding to the shift register groups 522_3 and 522_4 should be scanned, and the shift register groups 522_3 and 522_4 outputs scan signals to drive the corresponding display areas to display images.

In addition, the decoder 530 also decodes the start pulse signals STV1, STV2, STV3 and STV4 to obtain the information about which one of the fingerprint sensing zones SZ1, SZ2, SZ3 and SZ4 is to be scanned in the fingerprint sensing period T2. For example, when the logic values of the start pulse signals STV4, STV3, STV2 and STV1 are "0010", it indicates that the fingerprint sensing zone SZ2 corresponding to the shift register group 522_2 should be scanned, and thus the decoder 530 outputs the start pulse signal STV2' with a high signal level to the shift register group 522_2. The shift register group 522_2 outputs scan signals to drive the fingerprint sensing zone SZ2 to sense the fingerprint according to the start pulse signal STV2' and clock signals CK1 to CK3. Similarly, when the logic values of the start pulse signals STV4, STV3, STV2 and STV1 are "0011", it indicates that the fingerprint sensing zone SZ3 corresponding to the shift register group 522_3 should be scanned, and thus the decoder 530 outputs the start pulse signal STV3' with a high signal level to the shift register group 522_3. The shift register group 522_3 outputs scan signals to drive the fingerprint sensing zone SZ3 to sense the fingerprint according to the start pulse signal STV3' and clock signals CK1 to CK3.

The relationship of the logic values of the start pulse signals and the display areas to be scanned and the relationship of the logic values of the start pulse signals and the fingerprint sensing zones to be scanned are taken for example, and it does not intend to limit the invention. Therefore, even if the number of the display areas or the fingerprint sensing zones of the display panel increases, the number of the start pulse signals and the number of pins of the display panel for receiving the start pulse signals can be kept low by a decoding scheme, and thus a width of the side frame area of the display panel is small.

Figure 16:
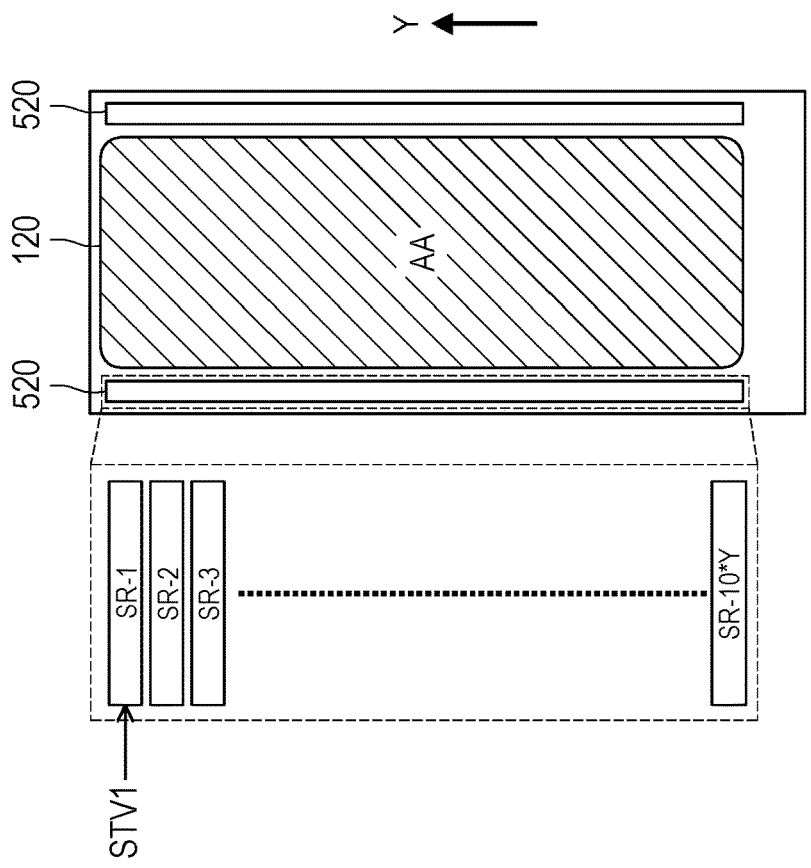
FIG. 16 is a schematic block diagram illustrating the display panel of FIG. 15 operating in a display period.
Figure 15:
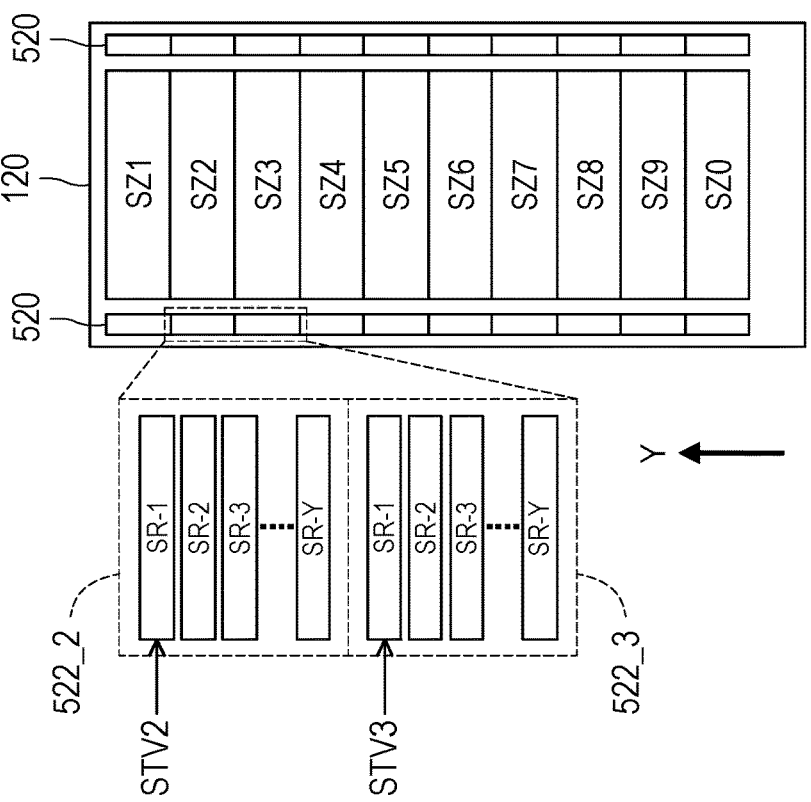
FIG. 15 is a schematic block diagram illustrating a display panel operating in a fingerprint sensing period according to an embodiment of the invention.
Figure 17:
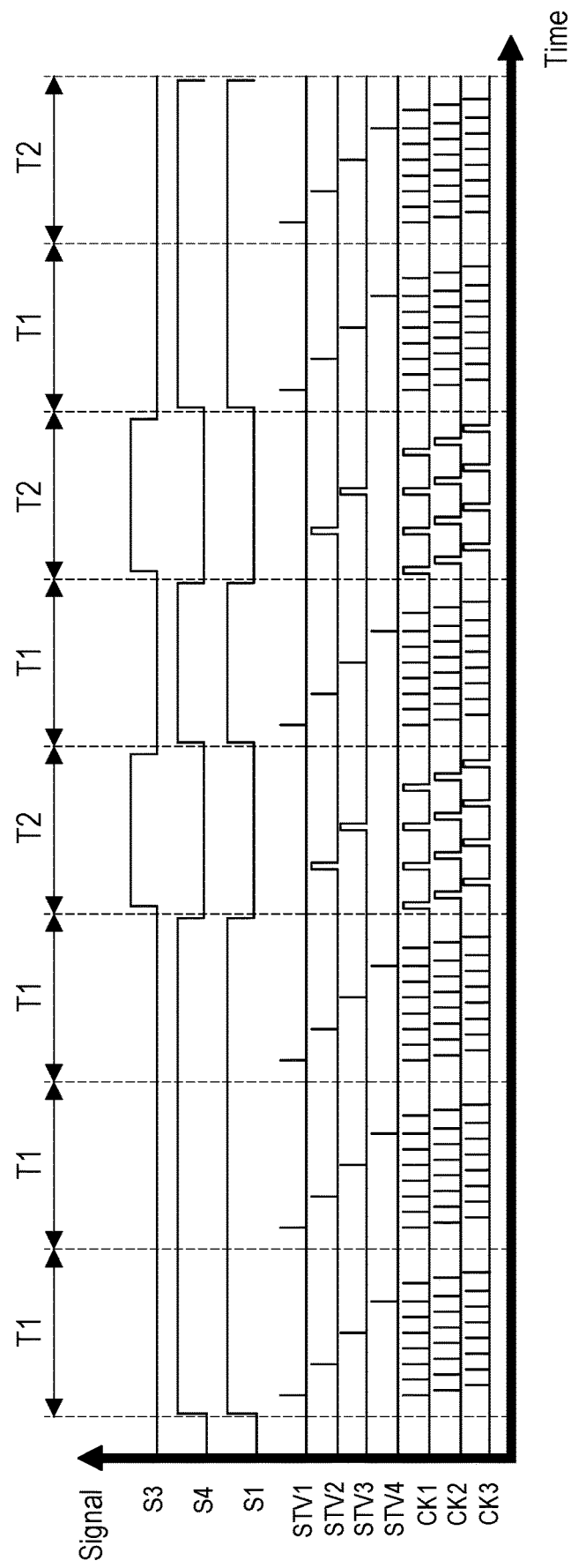
FIG. 17 is a waveform diagram of control signals for controlling an operation of the display panel of FIG. 15.

FIG. 15 is a schematic block diagram illustrating a display panel operating in a fingerprint sensing period according to an embodiment of the invention. FIG. 16 is a schematic block diagram illustrating the display panel of FIG. 15 operating in a display period. FIG. 17 is a waveform diagram of control signals for controlling an operation of the display panel of FIG. 15.

Referring to FIG. 15 to FIG. 17, the display panel 120 may have a display function and a fingerprint sensing function. Each of the gate driver circuits 520 also includes a plurality of shift register groups. For the fingerprint sensing operation, the display panel 120 is divided into more than four fingerprint sensing zones, e.g. ten fingerprint sensing zones in the present embodiment, in a column direction Y of the display panel 120. The number of the fingerprint sensing zones does not intend to limit the invention. When a finger touches the fingerprint sensing zones SZ2 and SZ3 in the fingerprint sensing period T2, the shift register groups 522_2 and 522_3 respectively scan the fingerprint sensing zones SZ2 and SZ3 to sense a fingerprint of the finger according to the start pulse signals STV2 and STV3. For further details, it can refer to the embodiment of FIG. 6.

For the display operation, the whole active area AA of the display panel 120 is driven to display images. The gate control circuit of the electronic circuit may output one start pulse signal STV1 to the gate driver circuit 520 in the display period T1, and thus the gate driver circuit 520 drives the display panel 520 to perform a display operation according to the one start pulse signal STV1. In the present embodiment, the gate driver circuit 520 includes a plurality of shift registers SR-1, SR-2, and SR-3 to SR-10Y, and since the shift registers SR-1, SR-2, and SR-3 to SR-10Y perform the display scanning operation according to the one start pulse signal STV1, the shift registers SR-1, SR-2, and SR-3 to SR-10Y may be deemed as a shift register group.

Figure 18:
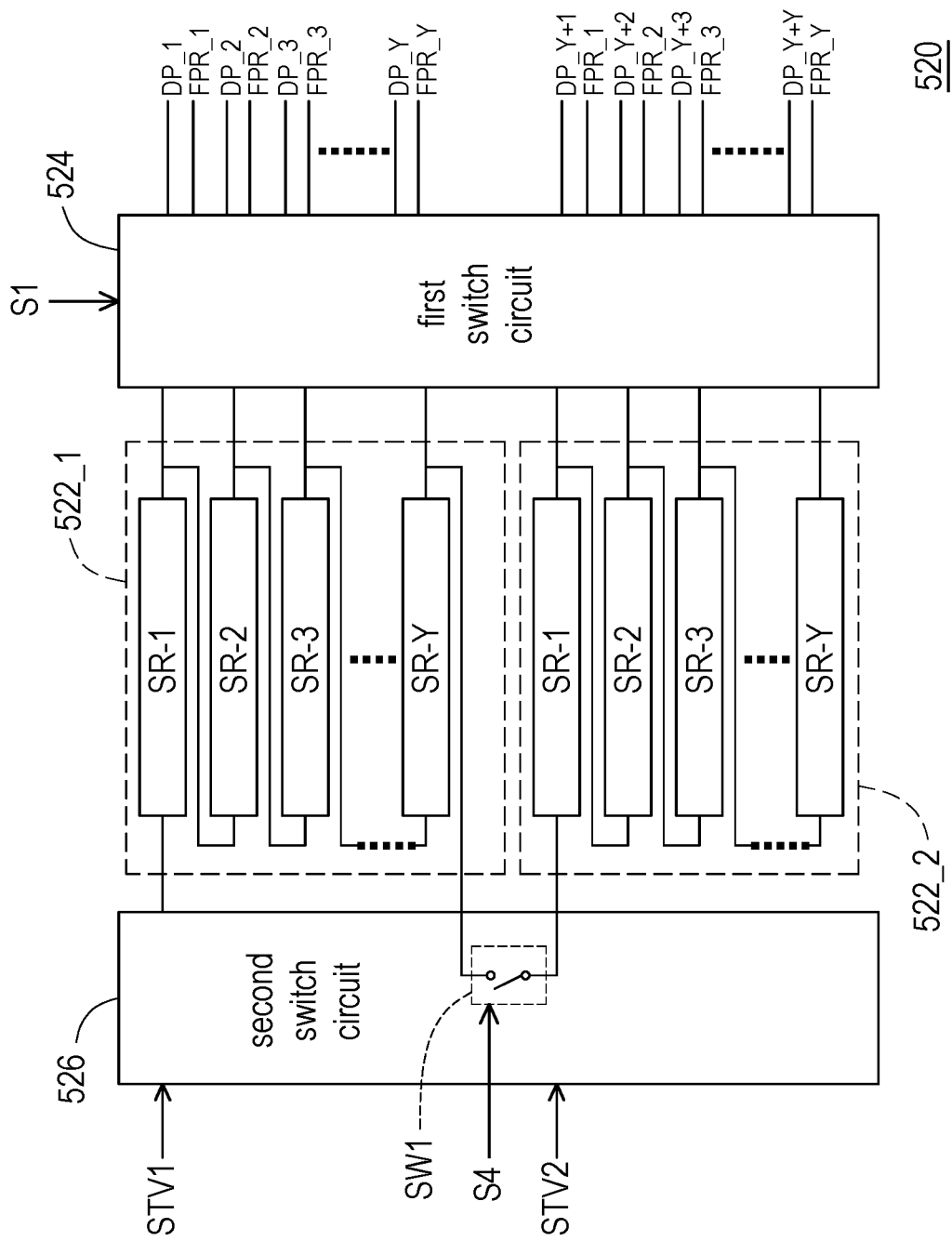
FIG. 18 is a schematic diagram illustrating the gate driver circuit according to another embodiment of the invention.

FIG. 18 is a schematic diagram illustrating the gate driver circuit according to another embodiment of the invention. Referring to FIG. 18, the gate driver circuit 520 includes the plurality of shift register groups 522_1 and 522_2, a first switch circuit 524 and a second switch circuit 526. The shift register groups 522_1 and 522_2 output a plurality of scan signals DP_1, DP_2, DP_3 to DP_Y, DP_Y+1, DP_Y+2 and DP_Y+3 to DP_Y+Y according to the start pulse signal STV1. The first switch circuit 524 receives the scan signals DP_1, DP_2, DP_3 to DP_Y, DP_Y+1, DP_Y+2 and DP_Y+3 to DP_Y+Y and outputs the scan signals DP_1, DP_2, DP_3 to DP_Y, DP_Y+1, DP_Y+2 and DP_Y+3 to DP_Y+Y to the display scan lines GDL in a display period T1 according to the switch control signal S1.

The second switch circuit 526 is coupled to the shift register groups 522_1 and 522_2. The second switch circuit 526 is configured to connect two adjacent shift register groups 522_1 and 522_2. The second switch circuit 526 is conducted according to a start pulse control signal S4 in the display period T1 to transmit the start pulse signal from a first shift register group 522_1 to a second shift register group 522_2 adjacent to the first shift register group 522_1. On the other hand, the second switch circuit 526 is not conducted according to the start pulse control signal S4 in the fingerprint sensing period T2.

To be specific, each of the shift register groups 522_1 and 522_2 includes a plurality of shift registers SR-1 to SR-Y. The shift register group 522_1 outputs scan signals DP_1, DP_2 and DP_3 to DP_Y via the first switch circuit 524 in the display period T1 according to the start pulse signal STV1. When the second switch circuit 526 is conducted in the display period T1, a scan signal DP_Y outputted from the last shift register SR-Y of the shift register group 522_1 is transmitted to the first shift register SR-1 of the shift register group 522_2 to serve as the start pulse signal via the second switch circuit 526. The shift register group 522_2 outputs scan signals DP_Y+1, DP_Y+2 and DP_Y+3 to DP_Y+Y via the first switch circuit 524 in the display period T1 according to the scan signal DP_Y outputted from the last shift register SR-Y of the shift register group 522_1.

In the present embodiment, the second switch circuit 526 includes a switch element SW1 for connecting the last shift register SR-Y of the shift register group 522_1 and the first shift register SR-1 of the shift register group 522_2. The conduction state of the switch element SW1 is controlled by the start pulse control signal S4. The switch element SW1 is conducted by the start pulse control signal S4 in the display period T1 to transmit the scan signal DP_Y. The switch element SW1 is not conducted by the start pulse control signal S4 in the fingerprint sensing period T2. When a finger touches the fingerprint sensing zones SZ1 and/or SZ2 in the fingerprint sensing period T2, the shift register groups 522_1 and/or 522_2 respectively scan the fingerprint sensing zones SZ1 and/or SZ2 to sense a fingerprint of the finger according to the start pulse signals STV1 and/or STV2.

In the present embodiment, only one switch element SW1 is illustrated in FIG. 18, but the invention is not limited thereto. The second switch circuit 526 may include a plurality of switch elements, and each of the switch elements connects two adjacent shift register groups. In addition, only two shift register groups are taken for example, but the number of the shift register up does not intend to limit the invention.

Figure 19:
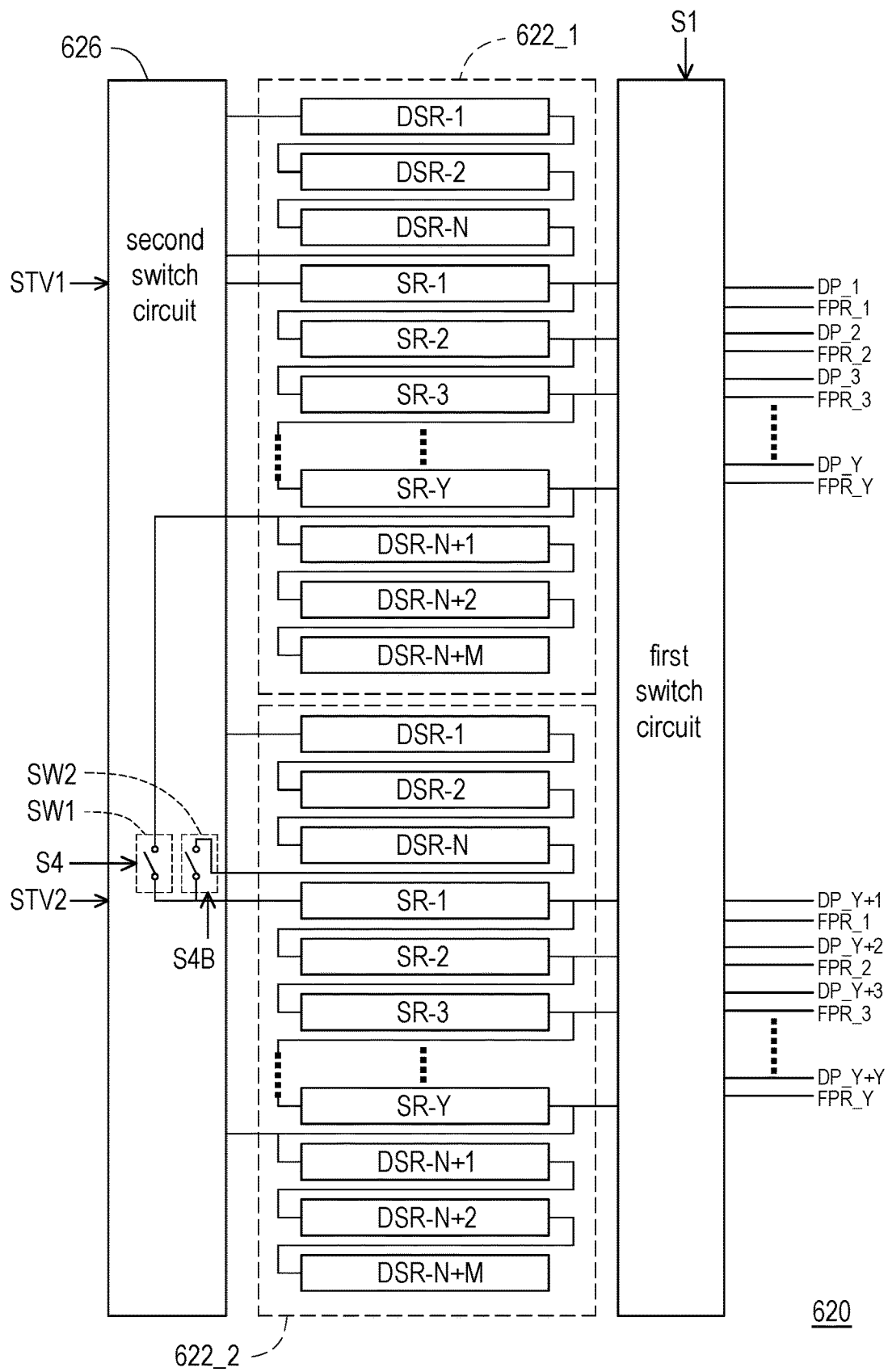
FIG. 19 is a schematic diagram illustrating the gate driver circuit according to another embodiment of the invention.

FIG. 19 is a schematic diagram illustrating the gate driver circuit according to another embodiment of the invention. Referring to FIG. 18 and FIG. 19, the gate driver circuit 620 of the present embodiment is similar to the gate driver circuit 520 of FIG. 18, and the main difference therebetween, for example, lies in that each of the shift register groups 622_1 and 622_2 further includes a plurality of dummy shift registers DSR-1, DSR-2, DSR-N, DSR-N+1, DSR-N+2 and DSR-N+M, and the dummy shift registers DSR-1, DSR-2, DSR-N, DSR-N+1, DSR-N+2 and DSR-N+M are skipped when the start pulse signal STV1 is transmitted via the second switch circuit 626.

To be specific, the second switch circuit 626 includes a first switch element SW1 and a second switch element SW2. The first switch element SW1 is controlled by the start pulse control signal S4. The second switch element SW2 is controlled by an inverse signal S4B, which is inverted from the start pulse control signal S4. When the first switch element SW1 is conducted, the second switch element SW2 is not conducted. When the first switch element SW1 is not conducted, the second switch element SW2 is conducted.

For the display operation, the first switch element SW1 is conducted, and the second switch element SW2 is not conducted. The shift registers SR-1 to SR-Y of the shift register group 622_1 outputs scan signals DP_1, DP_2 and DP_3 to DP_Y via the first switch circuit 524 in the display period T1 according to the start pulse signal STV1. The scan signal DP_Y outputted from the last shift register SR-Y of the shift register group 622_1 is transmitted to the first shift register SR-1 of the shift register group 622_2 to serve as the start pulse signal via the switch element SW1. That is to say, the dummy shift registers DSR-1, DSR-2, DSR-N, DSR-N+1, DSR-N+2 and DSR-N+M are skipped when the start pulse signal STV1 is transmitted from one shift register group to the next shift register group via the second switch circuit 626. Next, the shift register group 622_2 outputs scan signals DP_Y+1, DP_Y+2 and DP_Y+3 to DP_Y+Y via the first switch circuit 524 in the display period T1 according to the scan signal DP_Y outputted from the last shift register SR-Y of the shift register group 622_1.

For the fingerprint sensing operation, the first switch element SW1 is not conducted, and the second switch element SW2 is conducted. The shift register group 622_1 scan the fingerprint sensing zone SZ1 to sense a fingerprint of the finger according to the start pulse signal STV1. The shift register group 622_2 scan the fingerprint sensing zone SZ2 to sense the fingerprint of the finger according to the start pulse signal STV2. Since the second switch element SW2 is conducted, a signal outputted from the dummy shift register DSR-N of the shift register group 622_2 is transmitted to the shift register SR-1 of the shift register group 622_2 to serve as the start pulse signal via the second switch element SW2.

In summary, in some embodiments of the invention, the gate control circuit outputs the control signals to the gate driver circuit in the display period and the fingerprint sensing period via the same output nodes of the electronic circuit. Since the output nodes are shared for signal transmission during different operation periods, a width of the bottom/side frame area of the display panel is small. In some embodiments of the invention, the electronic circuit may drive the display panel according to a single start pulse signal in a manner of panel continuity control, or the electronic circuit may drive the display panel according to a plurality of start pulse signals in a manner of panel discrete control. In addition, by the decoding scheme, the number of the start pulse signals and the number of pins of the display panel for receiving the start pulse signals can be maintained or kept low even if the number of the display areas or the fingerprint sensing zones of the display panel increases, and thus a width of the side frame area of the display panel is small. In some embodiments of the invention, the gate driver circuit can operate in a time-division manner, so as to output different scan signals in different operation period.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit, adapted to control an operation of a gate driver circuit, wherein the gate driver circuit is disposed on a display panel, the electronic circuit comprising:
  a gate control circuit, configured to output a plurality of control signals to the gate driver circuit in a display period via a plurality of output nodes of the electronic circuit and output the control signals to the gate driver circuit in a fingerprint sensing period via the same output nodes of the electronic circuit,
  wherein the control signals comprise clock signals, a plurality of start pulse signals and at least one switch control signal, and the switch control signal is configured to control the gate driver circuit to operate in the display period or in the fingerprint sensing period,
  wherein the display panel is divided into a plurality of fingerprint sensing zones in a column direction of the display panel, and when the gate control circuit outputs the control signals to the gate driver circuit in the fingerprint sensing period, the gate driver circuit drives at least one fingerprint sensing zone of the fingerprint sensing zones to perform a fingerprint sensing operation according to the clock signals and the plurality of start pulse signals of the control signals,
  wherein the at least one fingerprint sensing zone to be driven by the gate driver circuit is indicated according to a combination of logic values of the plurality of start pulse signals, and a number of the plurality of start pulse signals is less than a number of the at least one fingerprint sensing zone to be driven by the gate driver circuit.

2. The electronic circuit of claim 1, wherein a finger touches only one fingerprint sensing zone of the fingerprint sensing zones in the fingerprint sensing period, and the gate control circuit outputs one start pulse signal to the gate driver circuit, and thus the gate driver circuit drives the only one fingerprint sensing zone to sense a fingerprint of the finger according to the one start pulse signal.

3. The electronic circuit of claim 1, wherein a finger touches at least two adjacent fingerprint sensing zones of the fingerprint sensing zones in the fingerprint sensing period, and the gate control circuit outputs at least two start pulse signals to the gate driver circuit, and thus the gate driver circuit drives the at least two adjacent fingerprint sensing zones to sense a fingerprint of the finger according to the at least two start pulse signals.

4. The electronic circuit of claim 1, wherein the gate control circuit outputs one start pulse signal to the gate driver circuit in the display period, and thus the gate driver circuit drives the display panel to perform a display operation according to the one start pulse signal.

5. The electronic circuit of claim 1, wherein the gate control circuit outputs a plurality of start pulse signals to the gate driver circuit in the display period, and thus the gate driver circuit drives different zones of the display panel to perform a display operation according to the respective start pulse signals.

6. A gate driver circuit, wherein the gate driver circuit is disposed on a display panel, and the display panel comprises a plurality of display scan lines and a plurality of fingerprint scan lines, the gate driver circuit comprising:
a plurality of shift register groups, configured to output a plurality of scan signals according to a plurality of start pulse signals and clock signals; and
a first switch circuit, coupled to the shift register groups and configured to receive the scan signals, wherein according to at least one switch control signal, the first switch circuit outputs the scan signals to the display scan lines in a display period and outputs the scan signals to the fingerprint scan lines in a fingerprint sensing period,
wherein the display panel is divided into a plurality of fingerprint sensing zones in a column direction of the display panel, and the shift register groups output the scan signals to the fingerprint scan lines to drive the respective fingerprint sensing zones to perform a fingerprint sensing operation according to the clock signals and the plurality of start pulse signals,
wherein the at least one fingerprint sensing zone to be driven by the gate driver circuit is indicated according to a combination of logic values of the plurality of start pulse signals, and a number of the plurality of start pulse signals is less than a number of the at least one fingerprint sensing zone to be driven by the gate driver circuit.

7. The gate driver circuit of claim 6, further comprising:
a second switch circuit, coupled to the shift register groups and configured to connect two adjacent shift register groups of the shift register groups, wherein the two adjacent shift register groups of the shift register groups comprise a first shift register group and a second shift register group adjacent to the first shift register group, and the second switch circuit is conducted according to a start pulse control signal in the display period to transmit the plurality of start pulse signals from the first shift register group to the second shift register group.

8. The gate driver circuit of claim 7, wherein the second switch circuit is not conducted according to the start pulse control signal in the fingerprint sensing period.

9. The gate driver circuit of claim 8, wherein a finger touches only one fingerprint sensing zone of the fingerprint sensing zones, and the corresponding shift register group outputs the scan signals to the fingerprint scan lines to drive the touched fingerprint sensing zone to perform the fingerprint sensing operation according to the corresponding start pulse signal in the fingerprint sensing period.

10. The gate driver circuit of claim 8, wherein a finger touches at least two adjacent fingerprint sensing zones of the fingerprint sensing zones, and the at least two corresponding shift register groups output the scan signals to the fingerprint scan lines to drive the touched at least two adjacent fingerprint sensing zones to perform the fingerprint sensing operation according to the respective start pulse signals in the fingerprint sensing period.

11. The gate driver circuit of claim 7, wherein each of the shift register groups comprises a plurality of shift registers, and when the second switch circuit is conducted in the display period, a scan signal outputted from a last shift register of the first shift register group is transmitted to a first shift register of the second shift register group to serve as the start pulse signal via the second switch circuit.

12. The gate driver circuit of claim 11, wherein each of the shift register groups further comprises a plurality of dummy shift registers, and the dummy shift registers are skipped when the start pulse signal is transmitted via the second switch circuit.

13. The gate driver circuit of claim 6, further comprising:
a decoder coupled to the shift register groups and configured to decode at least one encoded start pulse signal to generate the plurality of start pulse signals.

* * * * *